(12) United States Patent
Sakai et al.

(10) Patent No.: US 9,299,177 B2
(45) Date of Patent: Mar. 29, 2016

(54) APPARATUS, METHOD AND NON-TRANSITORY COMPUTER-READABLE MEDIUM USING LAYOUT SIMILARITY

(71) Applicant: CANON KABUSHIKI KAISHA, Tokyo (JP)

(72) Inventors: Hiroyuki Sakai, Chigasaki (JP); Kiyoshi Umeda, Kawasaki (JP); Yusuke Hashii, Tokyo (JP); Hiroyasu Kunieda, Yokohama (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 13/926,065

(22) Filed: Jun. 25, 2013

(65) Prior Publication Data

US 2014/0009495 A1 Jan. 9, 2014

(30) Foreign Application Priority Data

Jul. 9, 2012 (JP) ................................. 2012-154003

(51) Int. Cl.
*G06T 11/60* (2006.01)

(52) U.S. Cl.
CPC ...................................... *G06T 11/60* (2013.01)

(58) Field of Classification Search
CPC G06T 15/005; G06T 11/60; G09G 2340/125; G09G 5/395; H04N 9/641; B82Y 10/00; G06F 17/212; G06F 17/211; G06F 17/248; G06F 17/24
See application file for complete search history.

(56) References Cited

U.S. PATENT DOCUMENTS

| | | | |
|---|---|---|---|
| 5,218,387 A | 6/1993 | Ueno et al. | |
| 6,885,760 B2 | 4/2005 | Yamada et al. | |
| 6,895,103 B2 | 5/2005 | Chen et al. | |
| 6,965,684 B2 | 11/2005 | Chen et al. | |
| 8,385,659 B2* | 2/2013 | Duga et al. | 382/218 |
| 8,571,275 B2* | 10/2013 | Ryuto et al. | 382/118 |
| 2006/0279555 A1* | 12/2006 | Ono | 345/173 |
| 2008/0028298 A1* | 1/2008 | Kaneko | 715/243 |
| 2008/0089590 A1* | 4/2008 | Isomura et al. | 382/217 |
| 2010/0095204 A1* | 4/2010 | Kobayashi | 715/700 |
| 2010/0260415 A1 | 10/2010 | Sakai et al. | |
| 2010/0295998 A1 | 11/2010 | Sakai et al. | |
| 2012/0013642 A1 | 1/2012 | Sumi | |
| 2012/0293554 A1* | 11/2012 | Harada et al. | 345/660 |
| 2013/0016397 A1* | 1/2013 | Hoshikawa | 358/1.15 |

FOREIGN PATENT DOCUMENTS

| | | | |
|---|---|---|---|
| JP | 5-197793 A | 8/1993 | |
| JP | 8-063597 A | 3/1996 | |
| JP | 8-077334 A | 3/1996 | |
| JP | 2541688 B | 10/1996 | |

(Continued)

*Primary Examiner* — Todd Buttram
(74) *Attorney, Agent, or Firm* — Fitzpatrick, Cella, Harper & Scinto

(57) ABSTRACT

An apparatus comprises a generation unit configured to generate a plurality of layouts by arranging at least one image on a template; a decision unit configured to decide a display order of the plurality of layouts generated by the generation unit such that a similarity between two layouts that are successive in the display order becomes not more than a predetermined similarity; and a display control unit configured to cause a display device to display the plurality of layouts in accordance with the display order decided by the decision unit.

19 Claims, 32 Drawing Sheets

(56) References Cited

FOREIGN PATENT DOCUMENTS

| | | |
|---|---|---|
| JP | 11-53525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 3469031 B | 11/2003 |
| JP | 2009-245071 A | 10/2009 |
| JP | 2010-251999 A | 11/2010 |
| JP | 2010-273144 A | 12/2010 |

* cited by examiner

F I G. 10

| SENSING CLASSIFICATION | SENSING SUB-CLASSIFICATION | DATA TYPE | VALUE |
|---|---|---|---|
| BASIC IMAGE FEATURE AMOUNT | AVERAGE LUMINANCE | int | 0~255 |
| | AVERAGE SATURATION | int | 0~255 |
| | AVERAGE HUE | int | 0~359 |
| FACE DETECTION | NUMBER OF PERSON'S FACES | int | 0~MAXFACE |
| | COORDINATE POSITION | int * 8 | 0~Width or Height |
| | AVERAGE Y IN FACE REGION | int | 0~255 |
| | AVERAGE Cb IN FACE REGION | int | -128~127 |
| | AVERAGE Cr IN FACE REGION | int | -128~127 |
| SCENE ANALYSIS | SCENE RESULT | char | Landscape<br>Nightscape<br>Portrait<br>Underexposure<br>Others |

FIG. 11

```xml
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

FIG. 12

| CLASSIFICATION | CONTENTS | DATA TYPE | VALUE |
|---|---|---|---|
| IMAGE | FAVORITE RATE | int | 0~5 |
| | EVENT | char | "travel" "graduation" "wedding" |
| PERSON | NAME | char | "NAME" |
| | BIRTHDAY | char | YYYYMMDD |
| | FAMILY RELATIONSHIP | char | "family" "" |

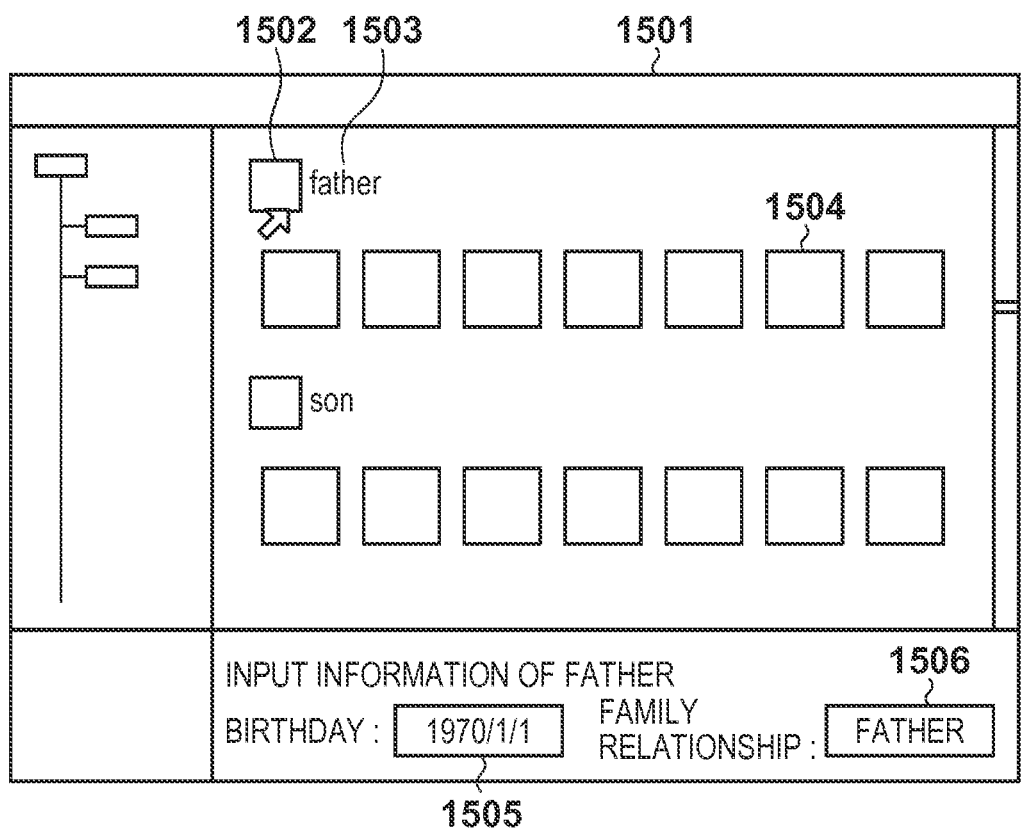

FIG. 18

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

F I G. 20

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

F I G. 24

| CATEGORY | CONTENTS | SCORE RANGE | DEGREE OF IMPORTANCE FOR EACH THEME(WEIGHT W) | | |
|---|---|---|---|---|---|
| | | | growth | travel | ... |
| INDIVIDUAL IMAGE EVALUATION | BRIGHTNESS APPROPRIATENESS | 0~100 | 0.5 | 1.0 | |
| | SATURATION APPROPRIATENESS | 0~100 | 0.5 | 1.0 | |
| IMAGE/SLOT MATCHING EVALUATION | PERSON MATCHING | 0~100 | 1.0 | 0.5 | |
| | TRIMMING LOSS DETERMINATION | 0~100 | 1.0 | 0.5 | |
| IN-PAGE BALANCE EVALUATION | IMAGE SIMILARITY | 0~100 | 0.5 | 1.0 | |
| | HUE VARIATION | 0~100 | 0.5 | 1.0 | |
| | FACE SIZE VARIATION | 0~100 | 0.5 | 1.0 | |
| OTHERS | USER'S TASTE | 0~100 | 0.8 | 0.8 | |

| IMAGE ID | SHOOTING DATE/TIME(YYYYMMDD : HHMMSS) |
|---|---|
| 25 | 20100101 : 120000 |
| 86 | 20100101 : 150000 |
| 102 | 20100101 : 170000 |
| 108 | 20100101 : 173000 |

F I G. 30

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

FIG. 31

```xml
<?xml version="1.0" encoding="utf-8" ?>
<LayoutInfo>
    <BASIC>
        <Theme>travel</Theme>
        <PageSize>A4</PageSize>
        <Resolution>300</Resolution>
        <MainGroup>son, mother, father</MainGroup>
    </BASIC>
    <ImageSlot>
        <ID>0</ID>
        <POSITION>
            <LeftTop x=100, y=200/>
            <LeftBottom x=100, y=800/>
            <RightTop x=1000, y=200/>
            <RightBottom x=1000, y=800/>
        </POSITION>
        <Shape>Rectangle</Shape>
        <PersonGroup>MainGroup</PersonGroup>
    </ImageSlot>
    <ImageSlot>
        <ID>1</ID>
        <POSITION>
            <LeftTop x=800, y=700/>
            <LeftBottom x=800, y=1500/>
            <RightTop x=1700, y=700/>
            <RightBottom x=1700, y=1500/>
        </POSITION>
        <Shape>Rectangle</Shape>
        <PersonGroup>MainGroup</PersonGroup>
    </ImageSlot>
    <ImageSlot>
        <ID>2</ID>
        <POSITION>
            <LeftTop x=300, y=1700/>
            <LeftBottom x=300, y=2300/>
            <RightTop x=1200, y=1700/>
            <RightBottom x=1200, y=2300/>
        </POSITION>
        <Shape>Rectangle</Shape>
        <PersonGroup>MainGroup</PersonGroup>
    </ImageSlot>
</LayoutInfo>
```

FIG. 32

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimingRatio>50.0</TrimingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimingRatio>38.0</TrimingRatio>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimingRatio>53.0</TrimingRatio>
        </ImageSlot>

.......

</LayoutInfo>
```

APPARATUS, METHOD AND NON-TRANSITORY COMPUTER-READABLE MEDIUM USING LAYOUT SIMILARITY

BACKGROUND OF THE INVENTION

1. Field of the Invention

The present invention relates to an apparatus, a method, and a non-transitory computer-readable medium.

2. Description of the Related Art

Recently, digital cameras that record an image shot by an image sensor as digital data are becoming widespread. There is also known a method of inserting an image shot by a digital camera into a background designed in advance to generate a composite image and thus making a printed product.

Japanese Patent Laid-Open No. 2009-245071 proposes processing of holding a plurality of templates in which image arrangement regions are set and merging an image with each image arrangement region of a template.

There is no originality in a method of causing a user to directly select a template prepared in advance. Hence, in Japanese Patent Laid-Open No. 2009-245071, a composite image is generated using the following method. First, using a shot image, the image is inserted into a background designed in advance to generate a composite image. A generated layout is defined as a basic layout. The parameters of the basic layout are changed, thereby creating a plurality of image merging results. For example, the parameters (the arrangement position, shape, and size of each image arrangement region or background color) of the basic layout are changed to generate a plurality of image merging results. The plurality of generated image merging results are sequentially displayed, and the user selects a desired one of the plurality of image merging results, as is proposed.

In Japanese Patent Laid-Open No. 2009-245071, when sequentially displaying the plurality of layouts created by changing the parameters of the basic layout, the layouts are displayed in accordance with the order of layout creation. Hence, if a plurality of similar layouts are continuously created, the plurality of similar layouts are continuously displayed. At this time, for example, if the user's desired layout is not included in the similar layouts, the user cannot display the desired layout only after the plurality of similar layouts have wholly been displayed.

SUMMARY OF THE INVENTION

The present invention has been made in consideration of the above-described problem, and provides an apparatus capable of displaying layouts in accordance with an appropriate order, a method, and a non-transitory computer-readable medium.

According to one aspect of the present invention, there is provided an apparatus comprising: a generation unit configured to generate a plurality of layouts by arranging at least one image on a template; a decision unit configured to decide a display order of the plurality of layouts generated by the generation unit such that a similarity between two layouts that are successive in the display order becomes not more than a predetermined similarity; and a display control unit configured to cause a display device to display the plurality of layouts in accordance with the display order decided by the decision unit.

According to another aspect of the present invention, there is provided a method comprising: a generation step of generating a plurality of layouts by arranging at least one image on a template; a decision step of deciding a display order of the plurality of layouts generated in the generation step such that a similarity between two layouts that are successive in the display order becomes not more than a predetermined similarity; and a display control step of causing a display device to display the plurality of layouts in accordance with the display order decided in the decision step.

According to the present invention, since two layouts that are successive in the display order can be displayed without similarity, it is possible to display the layouts in accordance with an appropriate display order.

Further features of the present invention will become apparent from the following description of exemplary embodiments (with reference to the attached drawings).

BRIEF DESCRIPTION OF THE DRAWINGS

FIG. 10 is a table showing an example of attribute information obtained by image analysis;

FIG. 11 is a view showing an example of an image analysis result saving format;

FIG. 12 is a table showing an example of attribute information that can manually be input by a user;

FIG. 15 is a view showing an example of a UI used to manually input person attribute information;

FIG. 16 is a view showing an example of a person attribute information saving format;

FIG. 18 is a view showing an example of the holding format of the layout template shown in FIG. 17;

FIG. 20 is a view showing an example of the holding format of the layout template shown in FIG. 19;

FIG. 24 is a table showing an example of layout evaluation values when performing automatic layout;

FIG. 30 is a view showing an example of holding a decided theme and main character information;

FIG. 31 is a view showing an example of holding a decided theme and main character information;

FIG. 32 is a view showing an example of holding generated automatic layout information;

DESCRIPTION OF THE EMBODIMENTS

<First Embodiment>

The first embodiment of the present invention will be described below to automatically generate a layout output matter using an input image group. This merely exemplifies a form of implementation, and the present invention is not limited to the following embodiment.

Note that in this embodiment, the layout output matter is assumed to be a collage output matter formed from one page for the sake of simplicity. However, the layout output matter may be an album output including a plurality of pages.

<Description of Hardware Arrangement>

Figure 1:
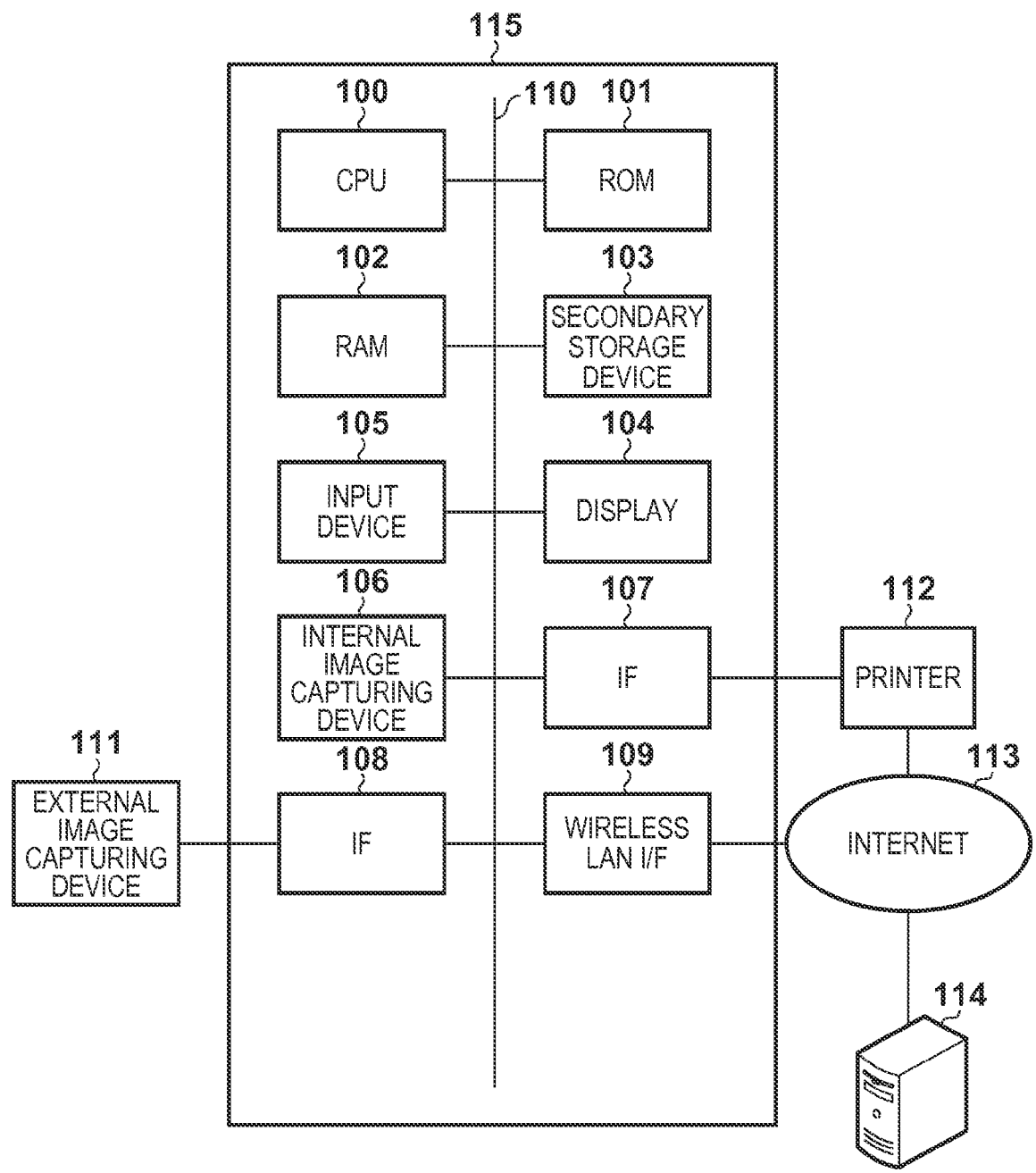
FIG. 1 is a block diagram showing a hardware arrangement capable of executing software of the present invention.

FIG. 1 is a block diagram for explaining an example of the hardware arrangement of an information processing apparatus according to the first embodiment. Referring to FIG. 1, an information processing apparatus 115 includes a CPU 100, a ROM 101, a RAM 102, a secondary storage device 103, a display device 104, an input device 105, an IF 107, an IF 108, and a wireless LAN I/F 109. The information processing apparatus also includes an internal image capturing device 106. They are connected to each other via a control bus/data bus 110. The information processing apparatus 115 of this embodiment functions as an image processing apparatus.

Referring to FIG. 1, the CPU (Central Processing Unit) 100 executes an information processing method to be described in this embodiment in accordance with programs such as an application. The ROM 101 stores the programs to be executed by the CPU 100. The RAM 102 provides a memory to temporarily store various kinds of information when the CPU 100 executes the programs. The secondary storage device 103 is formed from a hard disk or the like and serves as a storage medium to save, for example, a database that saves image files and image analysis results. The display device 104 is, for example, a display, and provides the user processing results of this embodiment and various kinds of UIs (User Interfaces) to be described below. The display device 104 may have a touch panel function. The control bus/data bus 110 connects the above-described units to the CPU 100. The information processing apparatus also includes the input device 105 such as a mouse or a keyboard used by the user to input an image correction processing instruction and the like.

The information processing apparatus 115 may include the internal image capturing device 106. An image captured by the internal image capturing device 106 undergoes predetermined image processing and is saved in the secondary storage device 103. The image data may be loaded from the external image capturing device 111 connected via the interface (IF 108). The information processing apparatus 115 also includes the wireless LAN I/F 109 to be connected to a wireless LAN (Local Area Network). The LAN is connected to the Internet 113. The information processing apparatus 115 can also acquire image data from an external server 114 connected to the Internet 113.

A printer 112 for outputting an image or the like is connected via the IF 107. Note that the printer 112 is also connected to the Internet 113 so that print data can be transmitted/received via the wireless LAN I/F 109.

Figure 2:
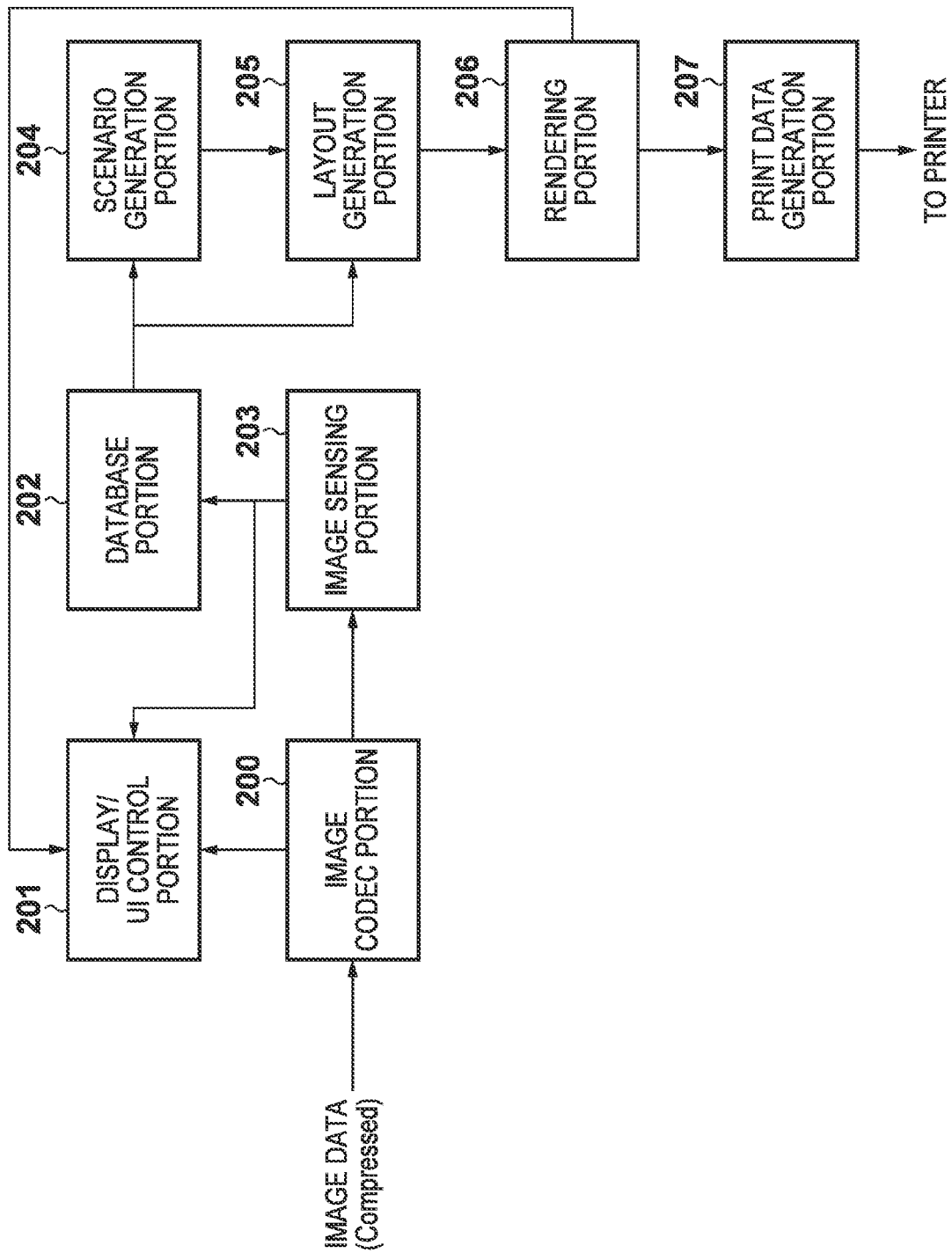
FIG. 2 is a block diagram showing a software configuration of processing of the present invention.

FIG. 2 is a block diagram of a basic software configuration including an application according to this embodiment.

Image data acquired by the information processing apparatus 115 normally has a compression format such as JPEG (Joint Photography Expert Group). Hence, an image codec portion 200 decompresses the compression format and converts it into a so-called RGB dot-sequential bitmap data format. The converted bitmap data is sent to a display/UI control portion 201 and displayed on the display screen of the display device 104 or the like.

The bitmap data is also input to an image sensing portion 203 (application). The image sensing portion 203 performs various kinds of analysis processing of the image (details to be described later). Various kinds of attribute information of the image obtained by the analysis processing are saved in the secondary storage device 103 by a database portion 202 (application) in accordance with a predetermined format. Note that image analysis processing and sensing processing will be handled in the same sense hereinafter.

A scenario generation portion 204 generates conditions of a layout to be automatically generated in accordance with various conditions input by the user. Details of processing of the scenario generation portion 204 will be described later. A layout generation portion 205 performs processing of automatically generating a layout in accordance with the scenario generated by the scenario generation portion 204.

A rendering portion 206 generates the display bitmap data of the layout generated by the layout generation portion 205. The bitmap data is sent to the display/UI control portion 201, and the result is displayed on the display.

The rendering result by the rendering portion 206 is also sent to a print data generation portion 207. The print data generation portion 207 converts the bitmap data into printer command data and sends it to a printer.

FIGS. 3 to 6 are flowcharts showing processing according to this embodiment.

Figure 3:
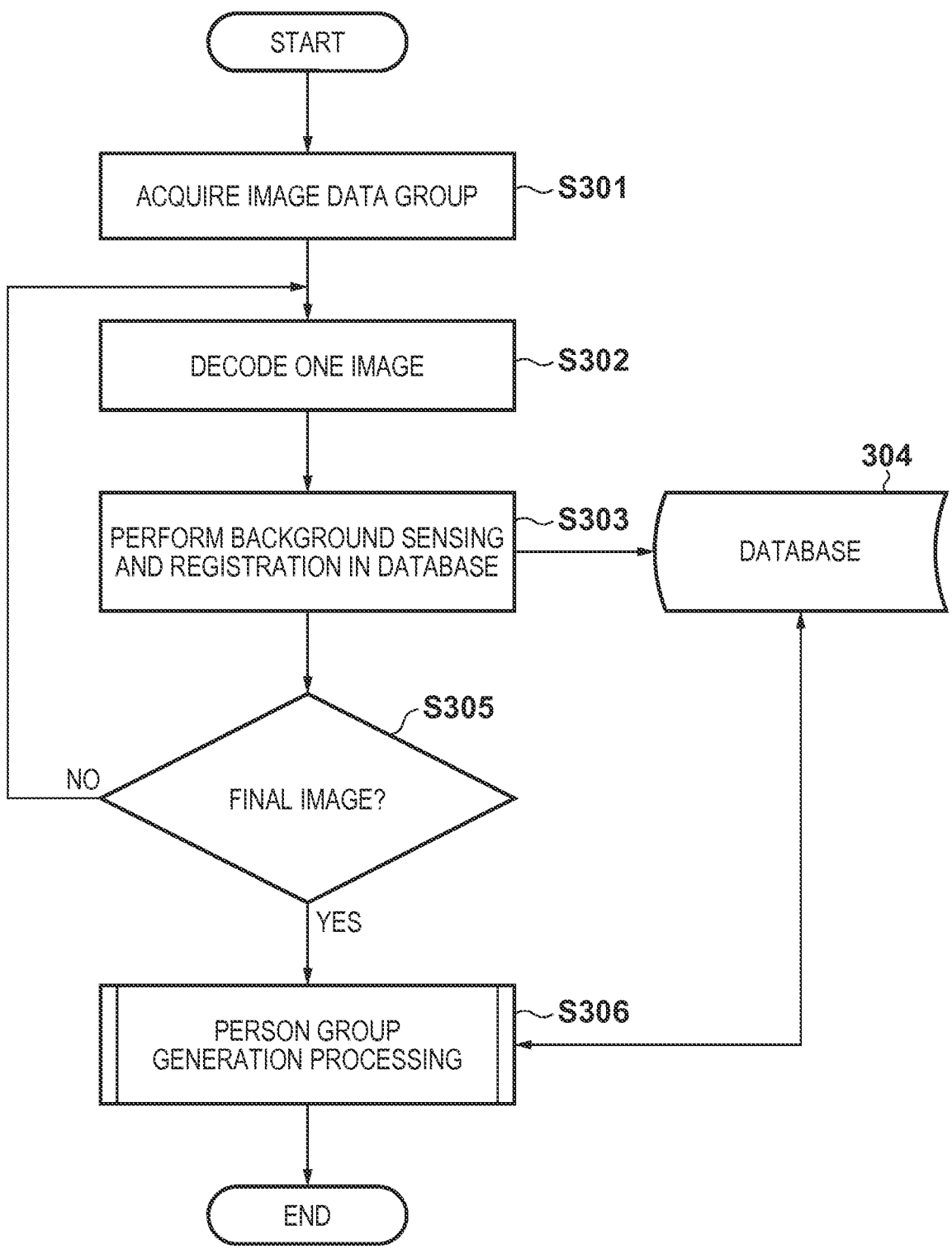
FIG. 3 is a flowchart of image analysis processing.
Figure 4:
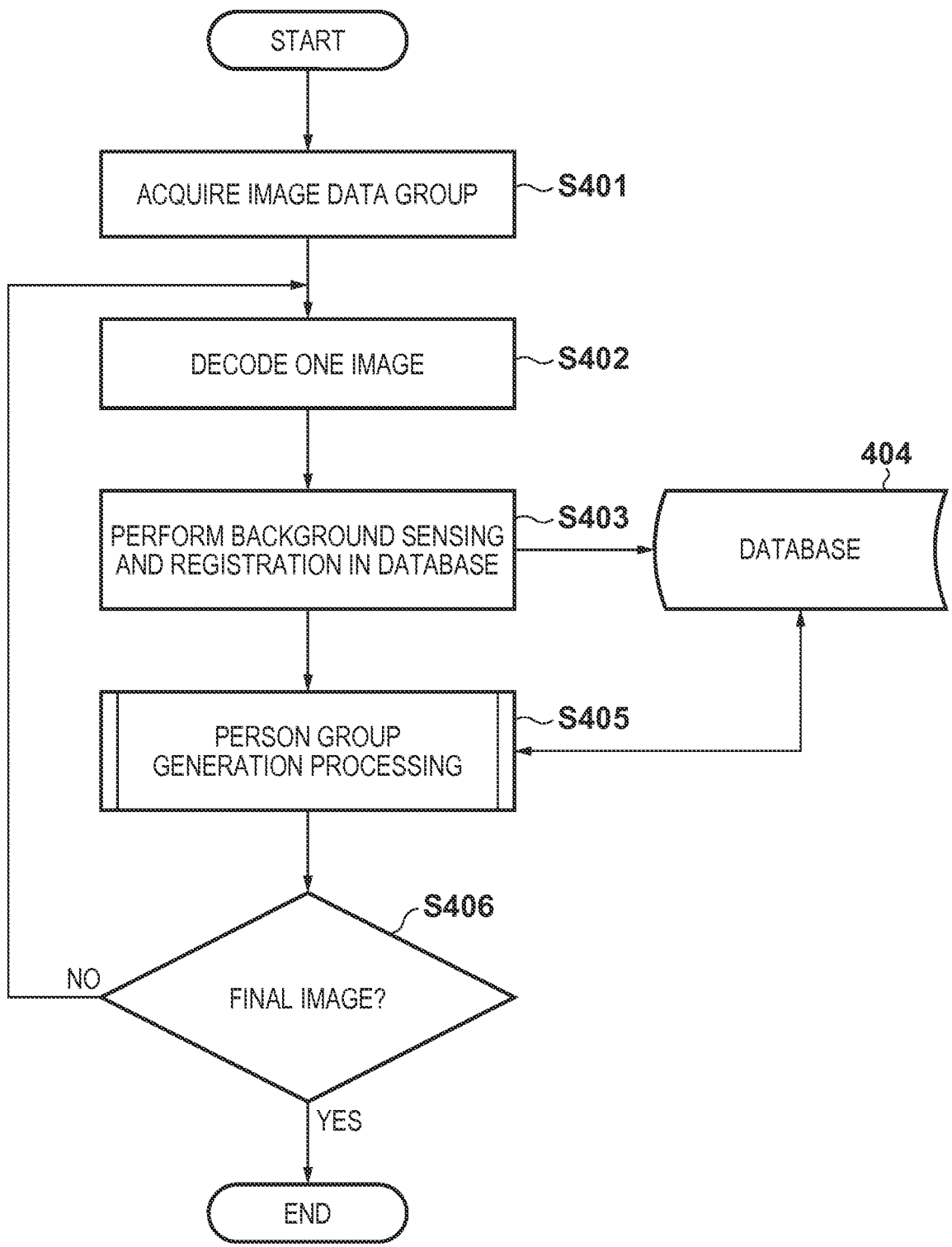
FIG. 4 is a flowchart of image analysis processing.

FIGS. 3 and 4 illustrate the procedure of the image sensing portion 203 or the procedure of acquiring a plurality of image data groups, performing analysis processing for each of them, and storing the result in the database.

Figure 5:
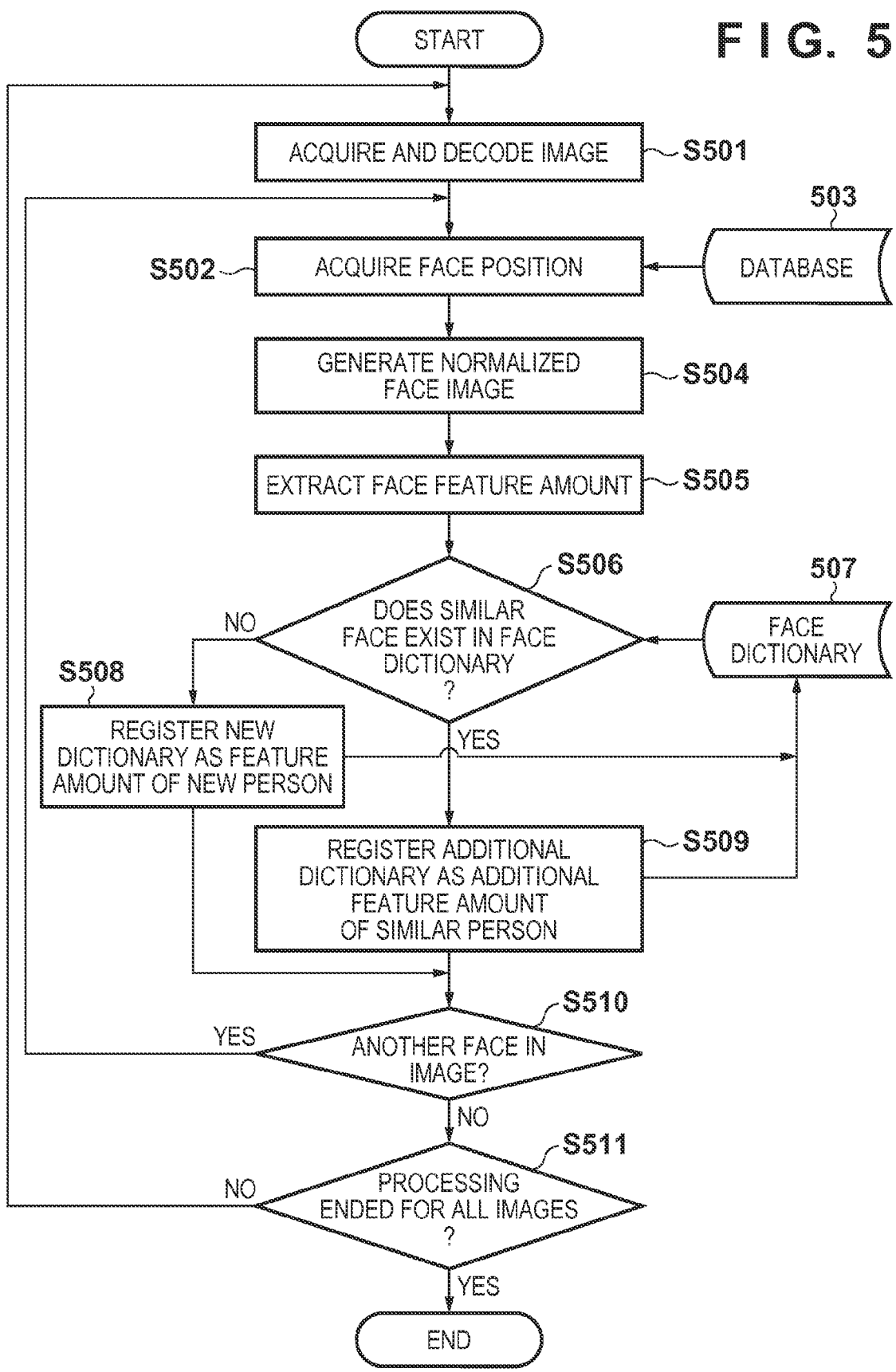
FIG. 5 is a flowchart of person group generation processing.

FIG. 5 illustrates the procedure of person grouping generation processing of grouping face information supposed to be of the same person based on detected face position information.

Figure 6:
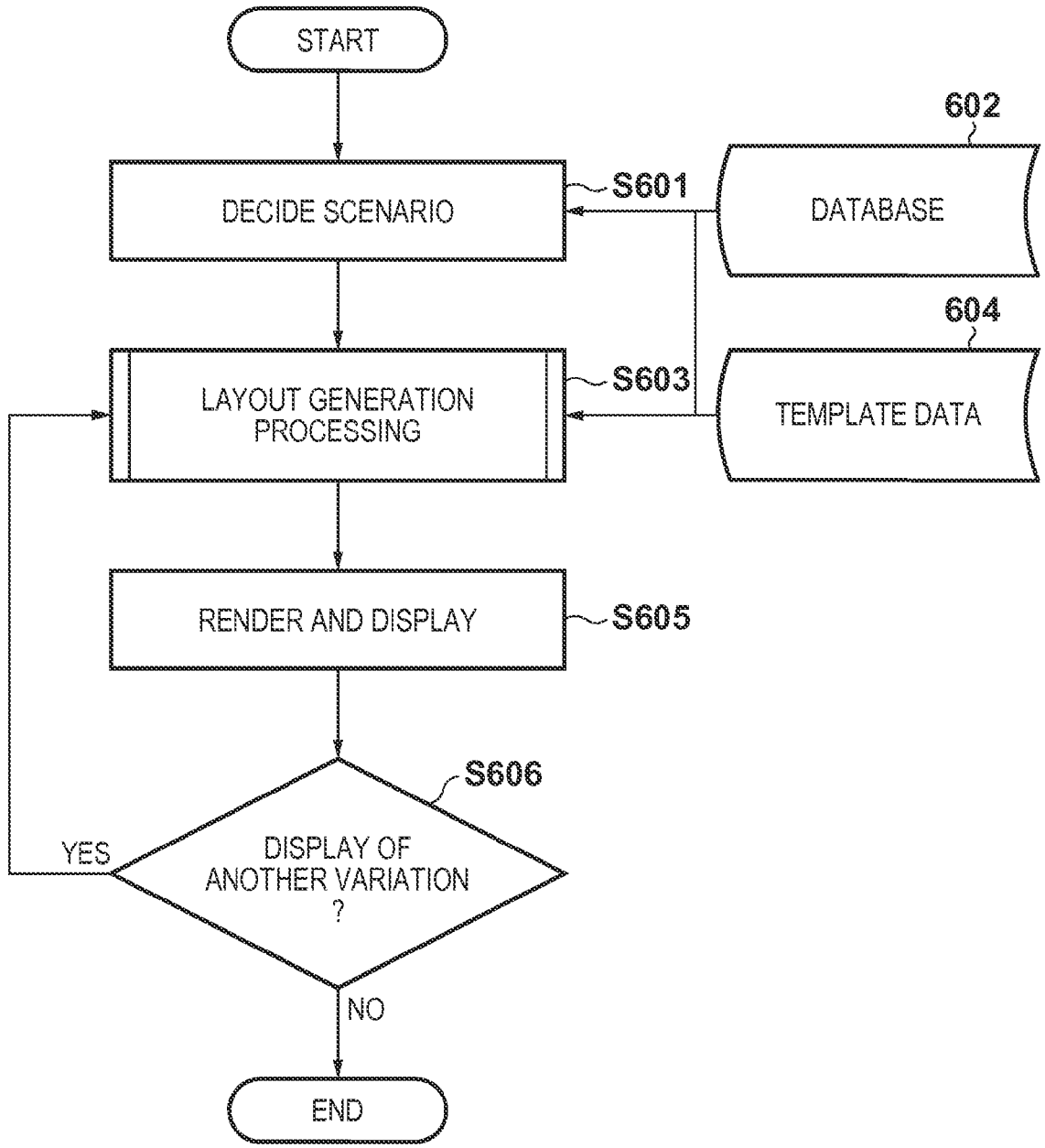
FIG. 6 is a flowchart of automatic layout proposal processing.

FIG. 6 illustrates the procedure of processing of deciding a scenario for layout creation based on the analysis information of an image and various kinds of information input by the user and automatically generating a layout based on the scenario.

The flowchart of processing executed by the image sensing portion 203 will be described first with reference to FIG. 3. In step S301 of FIG. 3, an image data group is acquired. To acquire the image data group, for example, the user connects an image capturing apparatus or memory card storing shot images to the information processing apparatus 115 and loads the shot images from these devices, thereby acquiring the image data. Images shot by the internal image capturing device 106 and saved in the secondary storage device 103 can also be acquired. Alternatively, the images may be acquired from an apparatus other than the information processing apparatus 115, for example, the external server 114 connected to the Internet 113 via the wireless LAN I/F 109.

Figure 8:
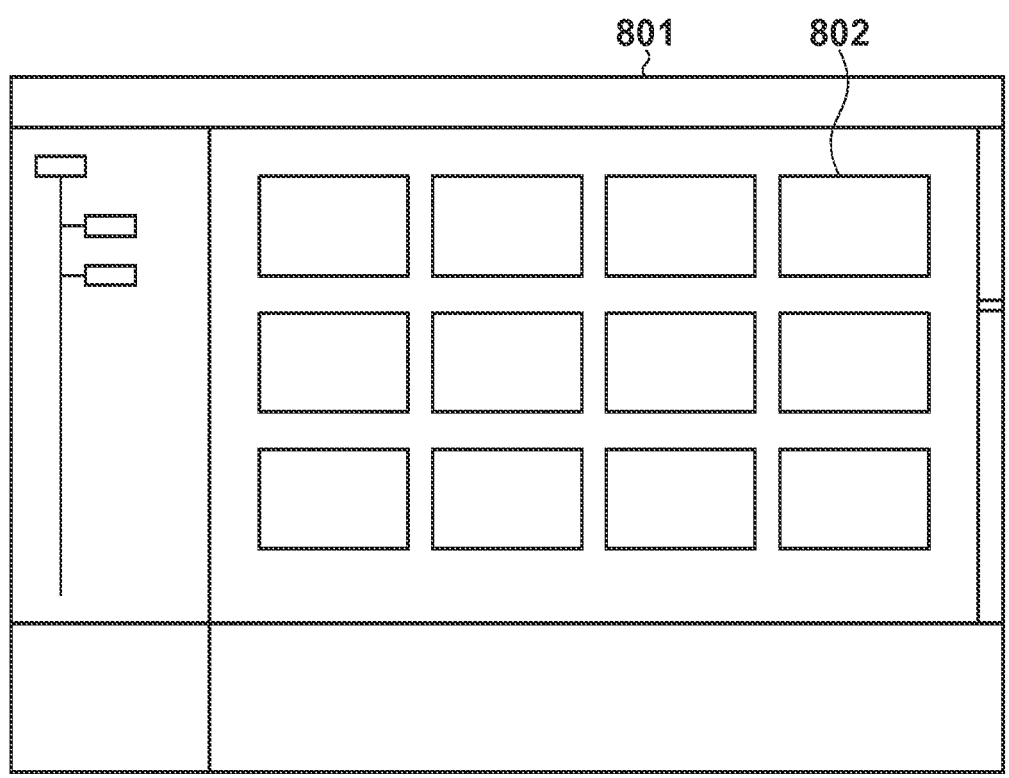
FIG. 8 is a view showing a display example of an image group in a thumbnail format.
Figure 9:
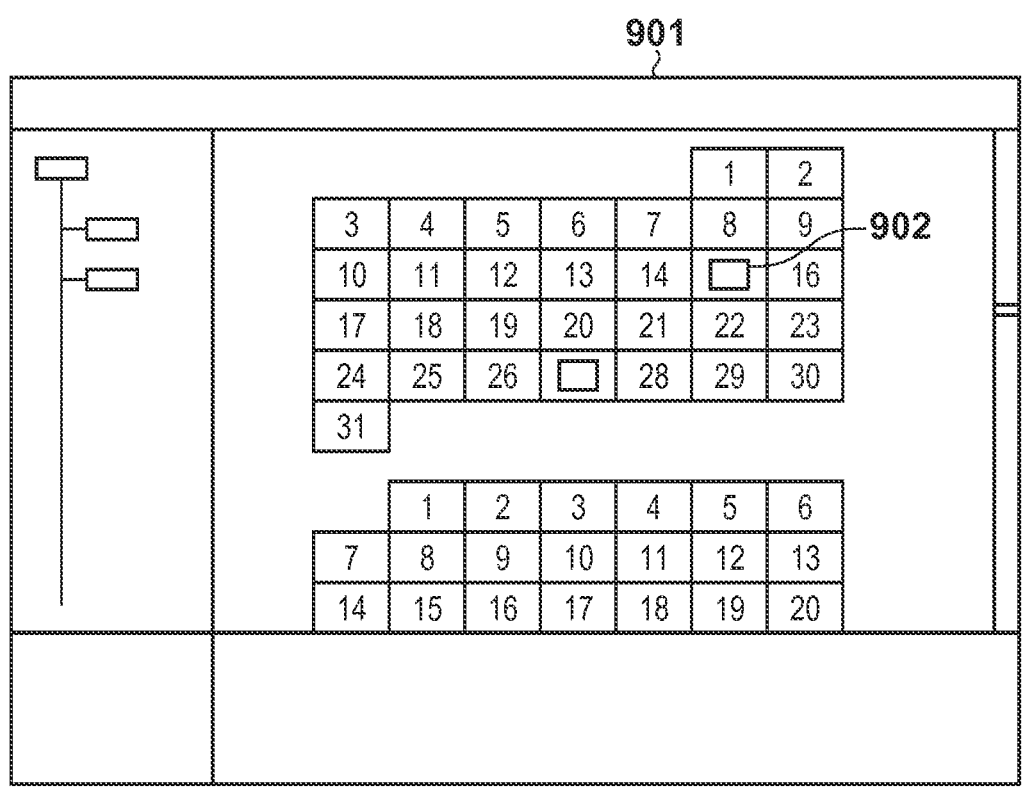
FIG. 9 is a view showing a display example of an image group in a calendar format.

Display of the display device 104 at the time of image data group acquisition will be described here with reference to FIGS. 8 and 9. When an image data group is acquired, a thumbnail group corresponding to the image data group is displayed on the display device 104, as shown in FIG. 8 or 9. The image display method of the display device 104 is not limited. For example, thumbnails 802 of the images may be displayed for each folder in the secondary storage device 103, as indicated by a UI 801 shown in FIG. 8. Alternatively, the images may be managed for each date on a UI 901 like a calendar, as shown in FIG. 9. When the user clicks on a date portion 902, images shot that day are displayed in a thumbnail list, as in the UI 801 shown in FIG. 8.

In steps S302 to S305, analysis processing and analysis result database registration are performed for each acquired image data group.

More specifically, in step S302, each image is decoded. First, the image sensing portion 203 (application) searches for an image newly saved and yet to undergo sensing processing. The codec portion converts each extracted image from compressed data to bitmap data.

In step S303, various kinds of sensing processing are executed for the converted bitmap data to acquire sensing information, and the sensing information is registered in the database. The sensing processing here indicates image analysis processing, and various kinds of image analysis processing shown in FIG. 10 are performed. More specifically, in this embodiment, face detection, face region feature amount analysis, image feature amount analysis, and scene analysis are performs, and results of data types as shown in FIG. 10 are calculated. In this embodiment, average luminance (int: value 0 to 255), average saturation (int: value 0 to 255), and average hue (int: value 0 to 359) are analyzed as the basic image feature amounts. In addition, the number of person's faces (int: value 0 or more (0 to MAXFACE)) and coordinate positions (int*8: value 0 or more (0 to Width or Height)) representing the position information of each person's face are analyzed as face detection. Furthermore, the average Y (int: value 0 to 255) in a face region, the average Cb (int: value −128 to 127) in a face region, and the average Cr (int: value −128 to 127) in a face region are analyzed.

Each sensing processing will be explained below.

The average luminance and the average saturation of an entire image, which are the basic image feature amounts, can be obtained by a known method and will therefore be described briefly. For the average luminance, the R, G, and B components of each pixel of the image are converted into known luminance and color difference components (for example, Y, Cb, and Cr components) (the conversion formula will be omitted), and the average value of the Y components is obtained. For the average saturation, the Cb and Cr components are calculated for each pixel, and the average value of S is obtained by $$S=\sqrt{Cb^2+Cr^2}$$

The average hue (AveH) in an image is a feature amount to evaluate the tone of the image. The hue of each pixel can be obtained using a known HIS conversion formula. The values are averaged in the entire image, thereby obtaining AveH.

The feature amounts may be calculated for the entire image. Alternatively, for example, the image may be divided into regions having a predetermined size, and the feature amounts may be calculated for each region.

Person's face detection processing will be described next. Various methods are usable as the person's face detection method according to this embodiment. For example, according to a method described in Japanese Patent Laid-Open No. 2002-183731, an eye region is detected from an input image, and a region around the eye region is set as a face candidate region.

The luminance gradient and the weight of the luminance gradient are calculated for the detected face candidate region. These values are compared with the gradient and the gradient weight of a preset ideal reference face image. At this time, when the average angle between the gradients is equal to or smaller than a predetermined threshold, the input image is determined to have a face region.

According to a method described in Japanese Patent Laid-Open No. 2003-30667, a flesh color region is detected from an image. A human iris color pixel is then detected in the flesh color region, thereby detecting the position of an eye.

According to a method described in Japanese Patent Laid-Open No. 8-63597, the level of matching between an image and each of a plurality of templates of face shapes is calculated. A template having the highest matching level is selected. If the highest matching level is equal to or more than a predetermined threshold, the region in the selected template is set as a face candidate region. Using this template makes it possible to detect the position of an eye.

According to a method described in Japanese Patent Laid-Open No. 2000-105829, an entire image or a designated region of an image is scanned using a nose image pattern as a template. A position that matches the template most is output as the position of the nose. Next, a region above the nose position in the image is assumed to be a region where the eyes exist. The eye existence region is scanned using an eye image pattern as a template, and matching is calculated. An eye existence candidate position set that is a set of pixels whose matching levels are higher than a threshold is obtained. In addition, a continuous region included in the eye existence candidate position set is divided into clusters. The distance between each cluster and the nose position is calculated. A cluster having the shortest distance is decided to be a cluster including an eye, thereby detecting the organ position.

As other face detection processing methods, for example, known methods of detecting a face and organ positions to be described below may be used. For example, Japanese Patent Laid-Open Nos. 8-77334, 2001-216515, 5-197793, 11-53525, 2000-132688, 2000-235648, and 11-250267 are usable. In addition, Japanese Patent No. 2541688 is usable.

As a result of the above-described processing, the number of human faces and the coordinate positions of each face can be acquired.

Once face coordinate positions in an image are known, the average luminance and the average color difference of the face region can be obtained by calculating, for each face region, the average Y, Cb, and Cr values of pixel values included in the face region.

Scene analysis processing can be performed using the feature amount of an image. For the scene analysis processing, a method disclosed in, for example, Japanese Patent Laid-Open Nos. 2010-251999 or 2010-273144 may be used. The scene analysis can acquire an ID to distinguish the shooting scene such as Landscape, Nightscape, Portrait, Underexposure, and Others.

Note that the sensing information is not limited to that acquired by the above-described sensing processing, and any other sensing information may be used.

The sensing information acquired in the above-described manner is saved in the database portion 202. The saving format in the database is not particularly limited. The sensing information is described using, for example, a general-purpose format (for example, XML: eXtensible Markup Language) as shown in FIG. 11 and stored.

FIG. 11 shows an example in which the attribute information of each image is classified into three categories and described. The first BaseInfo tag is information added to an acquired image file in advance and representing the image size and shooting time information. This tag includes the identifier ID of each image, the save location where the image file is stored, the image size, and the shooting date/time.

The second SensInfo tag is used to store the result of the above-described image analysis processing. The average luminance, average saturation, and average hue of the entire image and the scene analysis result are stored. In addition, information associated with the face position and face color of each person existing in the image can be described.

The third Userinfo tag can store information input by the user for each image. Details will be described later.

Note that the method of storing image attribute information in the database is not limited to that described above, and any other format is usable.

Next, in step S306 of FIG. 3, person grouping using personal recognition processing is performed. In this case, processing of generating a group for each person using the face position information detected in step S303 is performed. Automatically grouping person's faces in advance makes it possible to increase the efficiency of the user's operation of naming each person later.

This person group generation processing is executed using a known personal recognition technique in accordance with a processing procedure shown in FIG. 5.

Note that the personal recognition technique mainly includes two techniques, that is, extracting the feature of an organ such as an eye or a mouth existing in a face and comparing the similarities of the relationships. As the personal recognition technique, for example, a technique disclosed in Japanese Patent No. 3469031 can be used.

FIG. 5 is a basic flowchart of the person group generation processing (step S306 of FIG. 3 or step S405 of FIG. 4).

In step S501, the images saved in the secondary storage device 103 are sequentially read out and decoded. This decoding processing is the same as in step S302, and a description thereof will be omitted. In step S502, a database 503 is accessed, and the number of faces included in each image and the position information of each face are acquired. In step S504, normalized face images to be used for personal recognition processing are generated.

The normalized face images are face images obtained by extracting faces existing in the images with various sizes, orientations, and resolutions and converting them into faces having a predetermined size and orientation. Since the positions of organs such as an eye and a mouth are important in personal recognition, each normalized face image has such a size that makes it possible to reliably recognize the organs. When the normalized face images are prepared, it is unnecessary to cope with faces of various resolutions in the feature amount extraction processing.

In step S505, face feature amounts are extracted from the normalized face image. In this case, as a characteristic feature, the face feature amounts include the positions and sizes of organs such as an eye, mouth, and nose and the outline of the face.

In step S506, it is determined whether the face feature amounts are similar to face feature amounts in a database (to be referred to as a face dictionary 507 hereinafter) that stores face feature amounts prepared for each person identifier (ID) in advance. Note that details of the face dictionary will be described later.

If the determination of step S506 ends with "YES", the face is determined to belong to the same person and added to the dictionary ID of that person in step S509.

If the determination of step S506 ends with "NO", the current evaluation target face is determined to belong to a person different from those registered in the face dictionary so far. Hence, a new person ID is issued, and the face is added to the face dictionary 507. The processes of steps S502 to S509 are applied to all face regions detected from the input image group, and the appearing persons are grouped.

In step S510, it is determined whether another face region exists in the processing target image data. If another face region exists (YES in step S510), the process returns to step S502. On the other hand, if no other face region exists (NO in step S510), the process advances to step S511.

In step S511, it is determined whether the processes of steps S502 to S509 have ended for all images. If the processes have ended for all images, the processing ends. If the processes have not ended for all images, the process returns to step S502.

The grouping result in steps S502 to S509 is described using an ID tag for each face, as shown in the XML format of FIG. 16, and saved in the above-described database 304.

Note that in the above-described embodiment, the person group generation processing is executed after the sensing processing of all image data, as shown in FIG. 3. However, the present invention is not limited to this order. For example, as shown in FIG. 4, the sensing processing of step S403, the database registration, and the grouping processing (step S405) using the face detection position information may be repeated for each image.

Figure 7:
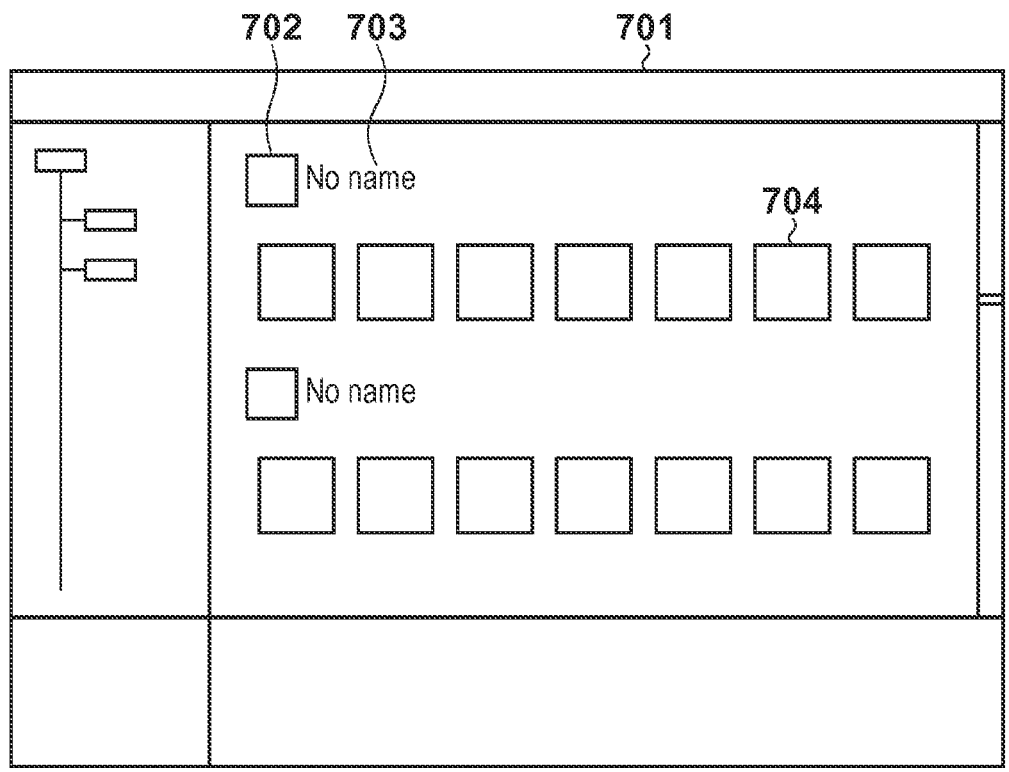
FIG. 7 is a view showing a display example of person groups.

Each person group obtained by the above-described processing is displayed on the UI of the display device 104. FIG. 7 shows the display of each person group according to this embodiment. On a UI 701 as shown in FIG. 7, reference numeral 702 denotes a representative face image of a person group. A region 703 to display the name of the person group exists on a side. Immediately after the automatic person grouping processing, "No name" is displayed as the person name in the region 703, as shown in FIG. 7. Reference numeral 704 denotes a plurality of face images included in the person group. In the UI 701 shown in FIG. 7, the user can input a person name by designating the "No name" region 703 or can input information such as the birthday or family relationship for each person, as will be described later.

The sensing processing may be executed using the background task of the operating system. In this case, the user can continue the sensing processing of the image group even when another operation is being performed on the computer.

In this embodiment, the user may manually input various kinds of attribute information about an image. Alternatively, various kinds of attribute information about an image may be set automatically.

FIG. 12 shows a list of examples of attribute information thus set manually or automatically. The attribute information is roughly divided into information set for each image and information set for each person grouped by the above-described processing.

Figure 13:
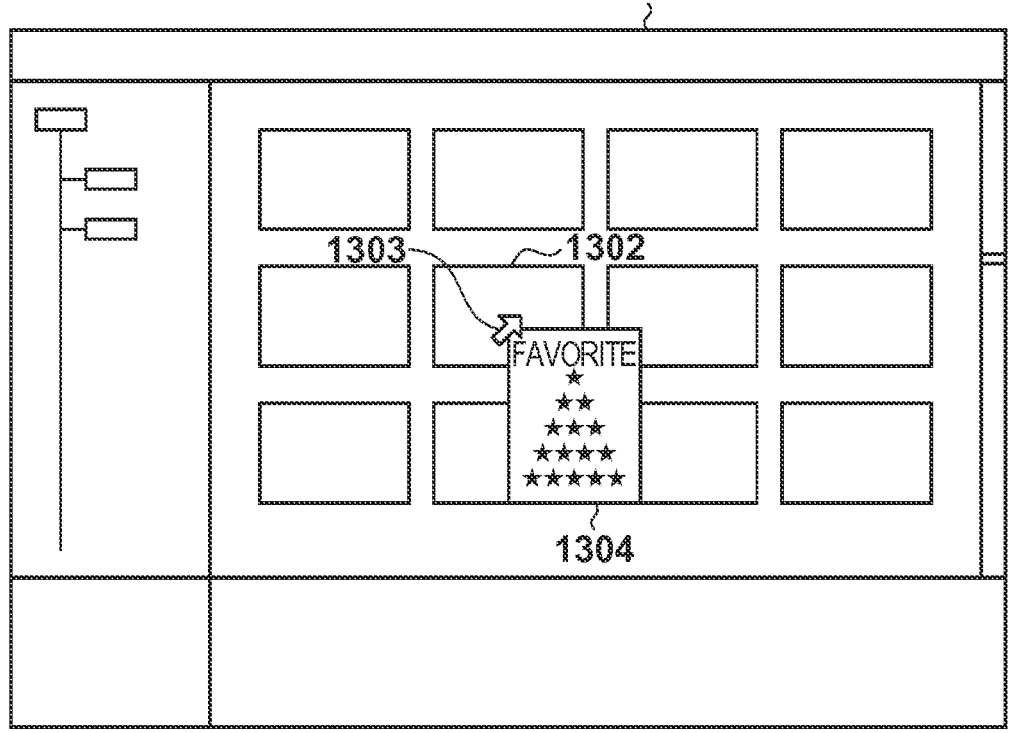
FIG. 13 is a view showing an example of a UI used to manually input the favorite rate.

An example of the information set for each image is the "favorite rate" of the user. The user can manually input the favorite rate representing whether the user likes the image. For example, as shown in FIG. 13, the user selects a desired thumbnail 1302 image on a UI 1301 by a mouse pointer 1303 and clicks the right bottom of the mouse, thereby displaying a dialogue capable of inputting the favorite rate. The user can select the number of ★ in the menu in accordance with his/her taste. In this embodiment, setting is done such that the higher the favorite rate is, the larger the number of ★ is.

The favorite rate may be set automatically, instead of causing the user to manually input. For example, the user's count of selecting a display target and viewing it may be set as the favorite rate. Assume that the user clicks on a desired image file in the state shown in FIG. 8 in which the thumbnail image list is displayed to transit to a single image display screen. The transition count may be measured as the favorite rate. That is, it can be judged that the larger the viewing count is, the more the user likes the image.

As another example, the favorite rate may be the printing count. When a print action is taken, it is judged that the user likes the image, as a matter of course. The favorite rate can be judged to be higher by measuring the printing count.

As described above, as for the favorite rate, various methods are available, including the method of causing the user to manually set the favorite rate and the method of automatically setting the viewing count or printing count based on the favorite rate. The pieces of set and measured information are individually stored in the Userinfo tag of the database portion 202 using the XML format as shown in FIG. 11. For example, the favorite rate is represented by a FavoriteRate tag, the viewing count is represented by a ViewingTimes tag, and the printing count is represented by a PrintingTimes tag.

Another attribute information set for each image is event information. Examples of the event information are "travel", "graduation", and "wedding".

Figure 14:
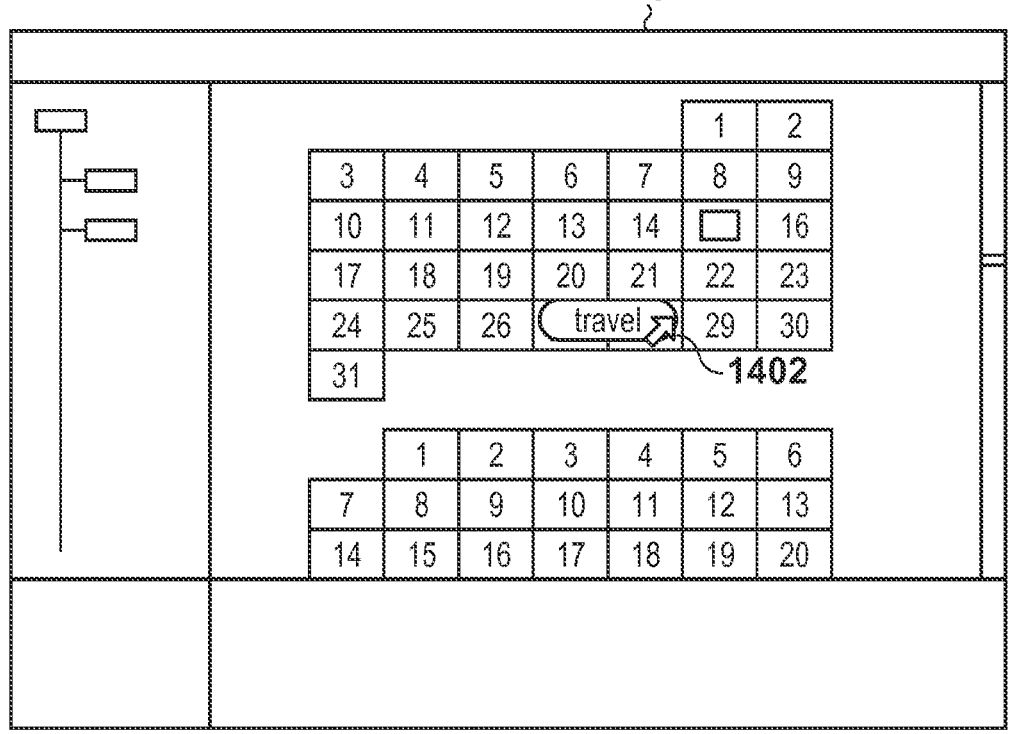
FIG. 14 is a view showing an example of a UI used to manually input event information.

To designate the event, for example, as shown in FIG. 14, a desired date may be designated on a calendar using a mouse pointer 1402 or the like, and the name of the event on that day may be input to set the event. The designated event name is included in the XML format shown in FIG. 11 as part of the image attribute information. In the form shown in FIG. 11, the event name and the image are linked with each other using an Event tag in the Userinfo tag.

Person attribute information will be described next with reference to FIG. 15.

FIG. 15 shows a UI used to input person attribute information. Referring to FIG. 15, reference numeral 1502 denotes a representative face image of a predetermined person (in this case, "father"). In addition, 1504 displays a list of images detected from other images and judged to have similar face feature amounts in step S506.

After the sensing processing, no name is input for each person group, as shown in FIG. 7. However, when the user designates the "No name" region 703 using a mouse pointer and inputs an arbitrary person name using a keyboard or the like, the person name input by the user is displayed in 1503, as shown in FIG. 15.

As an attribute of each person, the birthday of the person or the family relationship viewed from the user who is operating the application can also be set. When clicking on the representative face 1502 of the person shown in FIG. 15, the user can input the birthday of the clicked person using a first input portion 1505, as illustrated on the lower side of FIG. 15, and can also input family relationship information using a second input portion 1506.

Unlike the image attribute information linked with the images, the input person attribute information is managed in the database portion 202 separately from the image attribute information using the XML format as shown in FIG. 16.

Figure 17:
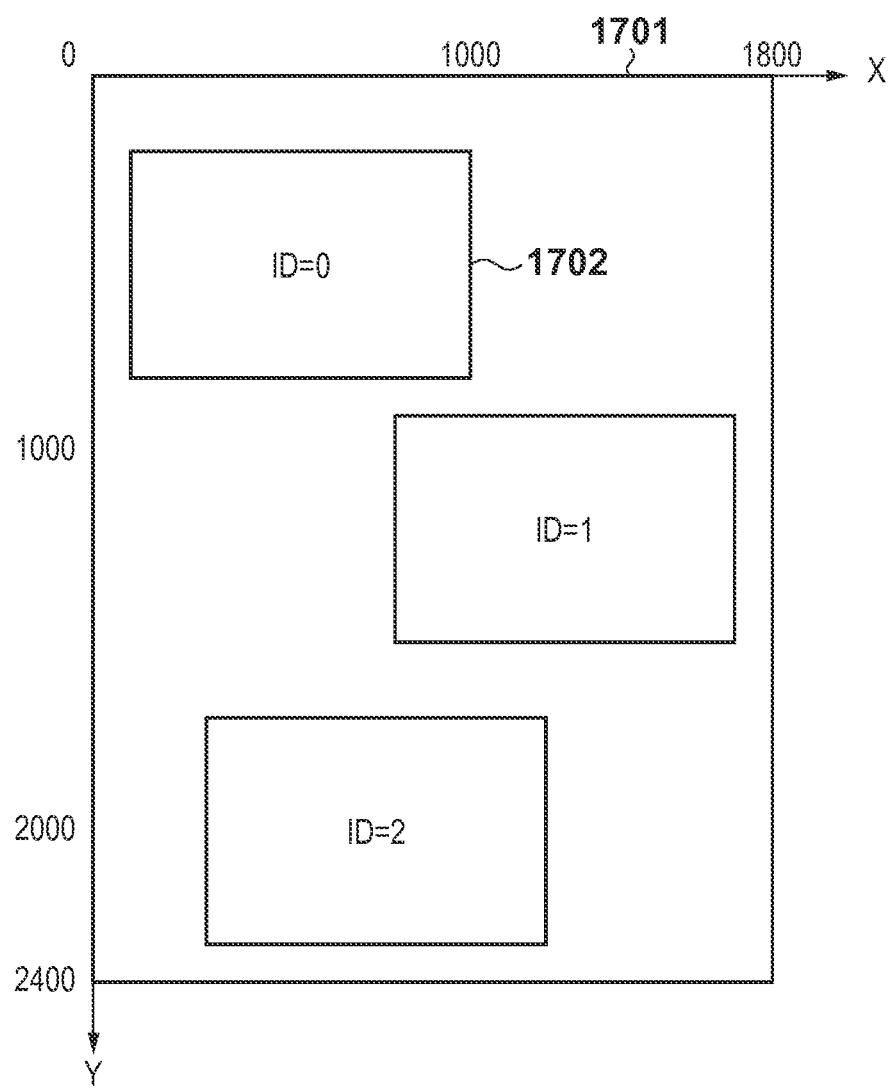
FIG. 17 is a view showing an example of a layout template.
Figure 19:
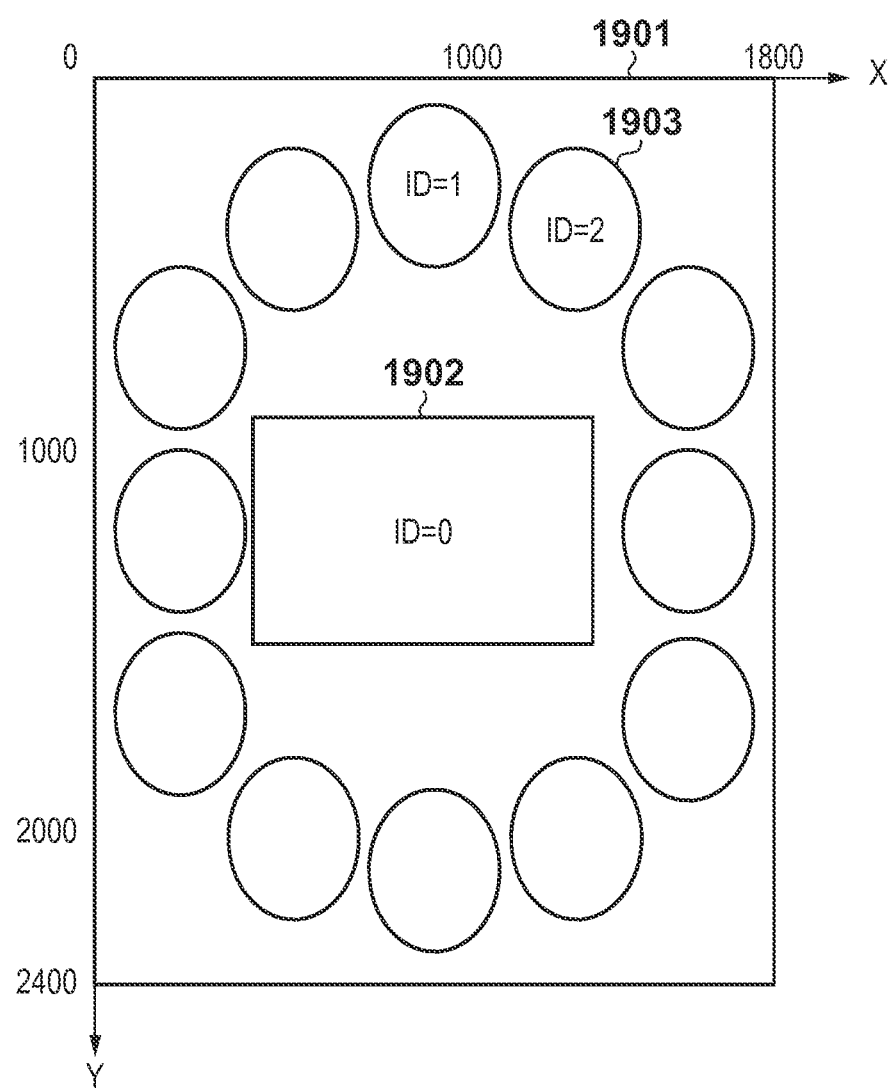
FIG. 19 is a view showing an example of a layout template.

In this embodiment, various layout templates are assumed to be prepared in advance. Examples of the layout templates are shown in FIGS. 17 and 19. Each layout template includes a plurality of image arrangement frames 1702 or 1902 (to be synonymous with slots hereinafter) on a paper size to lay out images.

A number of templates are prepared and saved in the secondary storage device in advance when the software to execute the embodiment is installed in the information processing apparatus 115. As another method, an arbitrary template group may be acquired from the external server 114 existing on the Internet 113 connected via the IF 107 or the wireless LAN I/F 109.

These templates are assumed to be described in a highly versatile structured language, for example, XML like the above-described sensing result storage. FIGS. 18 and 20 show examples of XML data. In FIGS. 18 and 20, first, a BASIC tag describes the basic information of the layout page. The basic information can include, for example, the theme of the layout, the page size, and the page resolution (dpi). Referring to FIGS. 18 and 20, a Theme tag representing the layout theme is blank in the initial state of the template. As the basic information, the page size is set to A4, and the resolution is set to 300 dpi.

Subsequently, information of each of the above-described image arrangement frames is described by an ImageSlot tag. The ImageSlot tag holds two tags, that is, an ID tag and a POSITION tag to describe the ID and position of the image arrangement frame. The position information is defined on, for example, an X-Y coordinate system having its origin at the upper left corner, as shown in FIG. 17 or 19.

The ImageSlot tag can also set, for each slot, the shape of the slot and the name of the recommended person group to be arranged. For example, in the template shown in FIG. 17, all slots have the "rectangle" shape, as indicated by the Shape tag in FIG. 18. As for the person group name, arranging "MainGroup" is recommended by the "PersonGroup" tag.

In addition, in the template shown in FIG. 19, the slot with ID=0 arranged at the center is described as a slot having the rectangle shape, as shown in FIG. 20. As for the person group, arranging "SubGroup" is recommended. The subsequent slots with ID=1, 2, . . . , have the ellipse shape. Arranging "MainGroup" as the person group is recommended.

In this embodiment, holding a number of such templates is recommended.

As described above, the application presented in this embodiment can execute analysis processing for an input image group, automatically group persons, and display them on a UI. Viewing the result, the user can input attribute information such as a name and birthday for each person group and set the favorite rate or the like for each image.

It is also possible to hold a number of layout templates classified by the theme.

When the above-described conditions are satisfied, the application of this embodiment performs, at a predetermined timing, processing of automatically generating a collage layout the user is likely to be fond of and presenting it to the user. This will be referred to as layout proposal processing hereinafter.

FIG. 6 is a basic flowchart to perform the proposal processing. In step S601, the scenario of proposal processing is decided. The scenario includes the theme of the layout to be proposed, decision of a template, settings of a person (main character) to be emphasized in the layout, and selection information of an image group to be used for layout generation.

Processing of deciding two scenarios will be described below.

For example, assume that setting is done in advance so as to automatically present a collage layout two weeks before the birthday of a person "son" automatically grouped in FIG. 15. Two weeks before the first birthday of the person "son", theme decision, template selection, and image selection are performed, thereby creating a layout. For the birthday, the theme of the layout to be proposed is decided as "growth". Next, a template is selected. In this case, a template as shown in FIG. 19 suitable for "growth" is selected, and "growth" is described in the Theme tag portion of XML, as shown in FIG. 20. FIG. 30 shows an example of XML data generated here. Next, "son" is set as the main character "MainGroup" on which focus is placed at the time of layout. Then, "son" and "father" are set as "SubGroup" on which focus is secondarily placed at the time of layout. An image group to be used for layout is selected. In this example, a database 602 is referred, and an enormous number of images including "son" are extracted and listed out of the images shot so far from the birthday of the person "son". The scenario decision for the growth layout has been described.

As an example different from that described above, assume that setting is done in advance so as to automatically generate and present a collage layout when there are travel photos shot within one month. Upon knowing, based on the event information registered in FIG. 14, that the family traveled several days ago, and an enormous number of images of the travel are saved in the secondary storage device 103, the layout generation portion 205 decides a scenario to propose a travel layout. In this case, the theme of the layout to be proposed is decided as "travel". Next, a template is selected. In this case, a layout as shown in FIG. 17 is selected, and "travel" is described in the Theme tag portion of XML, as shown in FIG. 31. Then, "son", "mother", and "father" are set as the main character "MainGroup" on which focus is placed at the time of layout. In this way, a plurality of persons can be set as "MainGroup" by taking advantage of the characteristics of XML. Next, an image group to be used for layout is selected. In this example, the database 602 is referred, and an enormous number of images linked with the travel event are extracted and listed. The scenario decision for the travel layout has been described.

Figure 21:
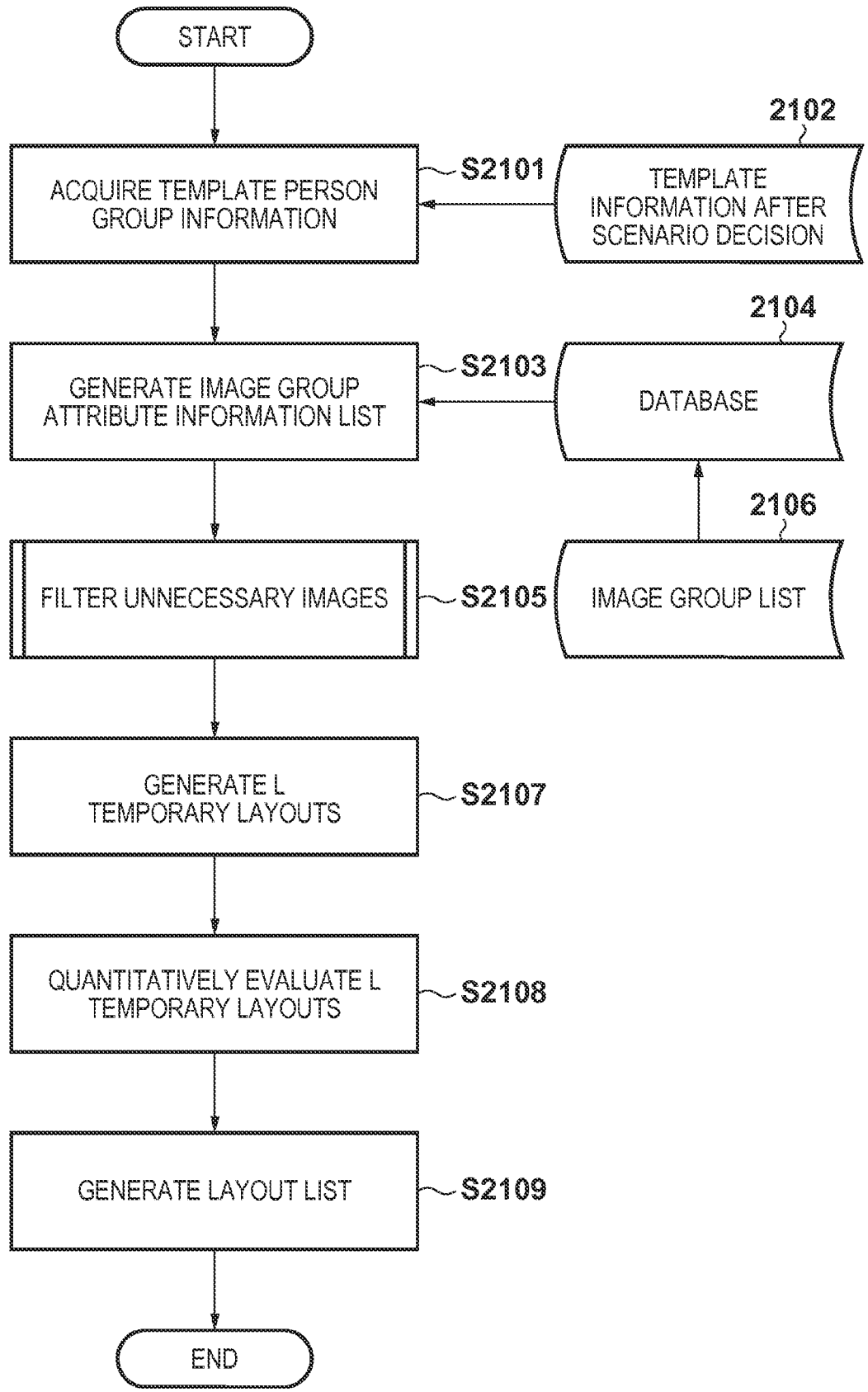
FIG. 21 is a flowchart of automatic layout proposal processing according to the first embodiment.

Next, in step S603 of FIG. 6, automatic layout generation processing based on the above-described scenario is executed. The automatic layout generation processing based on the scenario will be described here with reference to FIG. 21. FIG. 21 illustrates the detailed processing procedure of the layout generation portion 205.

Referring to FIG. 21, in step S2101, layout template information 2102 decided by the above-described scenario after the layout theme and the person group information are set is acquired.

In step S2103, the feature amounts of each image are acquired from a database 2104 based on an image group list 2106 decided by the scenario, and an image group attribute information list is generated. The image group attribute information list has a structure in which the IMAGEINFO tags shown in FIG. 11 are arranged as many as the number of image lists. The automatic layout generation processing in steps S2105 to S2109 is performed based on the image group attribute information list.

As described above, in the automatic layout generation processing of this embodiment, attribute information saved in the database in advance by performing sensing processing for each image is used, instead of directly handling the image data itself. This is because if the image data itself is used when performing the layout generation processing, a very large memory area is necessary for storing the image group. That is, using the attribute information stored in the database portion 202 makes it possible to reduce the utilization of the memory area.

Figure 22:
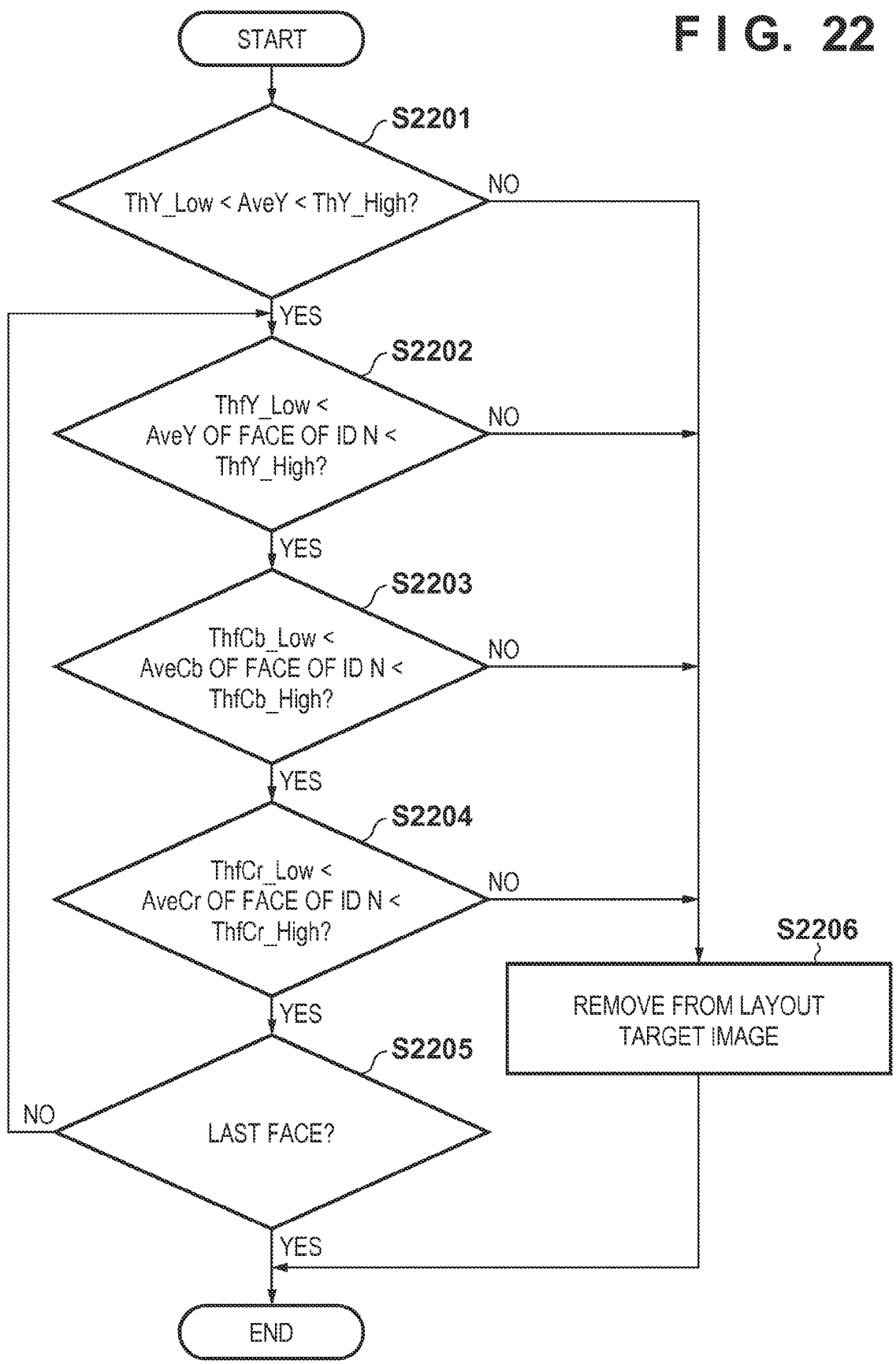
FIG. 22 is a flowchart of unnecessary image filtering processing according to the first embodiment.

In step S2105, unnecessary images are filtered from the input image group using the attribute information of the input image group. The filtering processing will be described here with reference to FIG. 22. FIG. 22 is a flowchart of the filtering processing. Referring to FIG. 22, in step S2201, it is determined for each image whether the average luminance (AveY) of the entire image falls within the range of predetermined thresholds (ThY_Low and ThY_High). If NO in step S2201, the process advances to step S2206 to remove the image of interest from the layout target.

Similarly, in steps S2202 to S2205, whether the average luminance and average color difference components (AveY, AveCb, and AveCr) fall within the ranges of predetermined thresholds representing a satisfactory flesh color region is determined for each face region included in the image of interest. More specifically, in step S2202, it is determined whether AveY of a face region with ID=N falls within the range of predetermined thresholds (ThfY Low and ThfY High). In step S2203, it is determined whether AveCb of the face region with ID=N falls within the range of predetermined thresholds (ThfCb_Low and ThfCb High). In step S2204, it is determined whether AveCr of the face region with ID=N falls within the range of predetermined thresholds (ThfCr_Low and ThfCr High). In step S2205, it is determined whether the face is the last face. If the face is not the last face, the process returns to step S2202. If the face is the last face, the processing ends.

Only an image for which all determinations of steps S2202 to S2205 end with "YES" is applied to the subsequent layout generation processing.

Note that since this filtering processing aims at removing images that can obviously be judged as unnecessary for the subsequent temporary layout creation processing, the thresholds are set relatively leniently. For example, in the overall image luminance determination of step S2201, if the difference between ThY_High and ThY_Low is excessively smaller than the image dynamic range, the number of images determined as "YES" in each determination accordingly decreases. To prevent this, in the filtering processing of this embodiment, the difference between the thresholds is set as large as possible. In addition, thresholds that can remove an image that is obviously judged as an abnormal image are set.

Next, in step S2107 of FIG. 21, an enormous number of (L) temporary layouts are generated using the image group determined as the layout target by the above-described processing. Temporary layout generation is executed by repeating processing of arbitrarily applying an input image to an image arrangement frame of the acquired template. When arranging the input image, various kinds of decision processing are performed at random. More specifically, which image should be selected from the image group when N image arrangement frames exist in the layout is decided at random. In addition, which arrangement frames in a template should be used to arrange a plurality of selected images is decided at random. Furthermore, a trimming ratio representing the degree of trimming processing to be performed when the images are arranged in the arrangement frames is decided at random.

Figure 23:
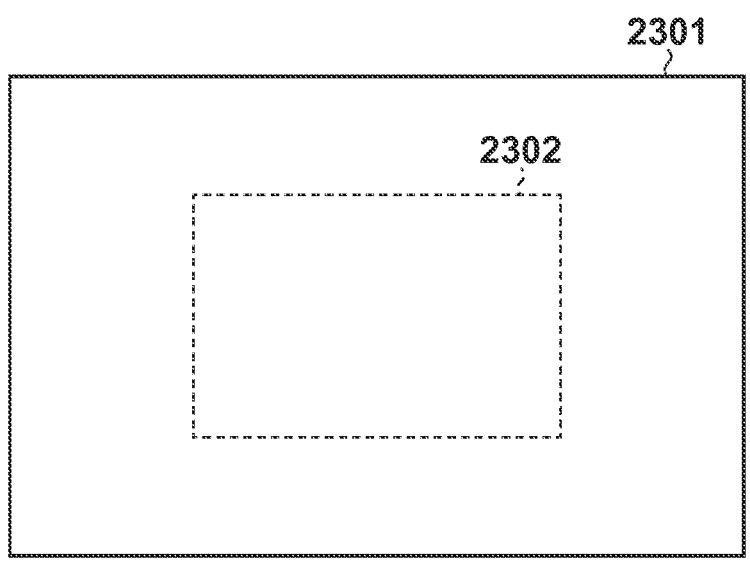
FIG. 23 is a view showing an example of automatic trimming processing.

Note that the trimming ratio is represented by, for example, 0% to 100%. An image is trimmed using its center as the reference, as shown in FIG. 23. Referring to FIG. 23, reference numeral 2301 denotes an entire image; and 2302, a cutting frame for trimming at a trimming ratio of 50%.

Based on the above-described image selection/arrangement/trimming criterion, temporary layouts are generated as many as possible. The generated temporary layouts can be expressed by XML, as shown in FIG. 32. The ID of the image selected and arranged in each slot is described by the ImageID tag, and the trimming ratio is described by the TrimmingRatio tag.

Note that the number L of temporary layouts generated here is decided in accordance with the throughput of evaluation processing in a layout evaluation step to be described later and the performance of the information processing apparatus 115 that performs the processing. Each generated temporary layout can be saved together with an ID in the secondary storage device 103 as a file using the XML format shown in FIG. 32, or stored on the RAM 102 using another data structure such as a structure.

Next, in step S2108 of FIG. 21, the L temporary layouts created above are evaluated using predetermined layout evaluation amounts. FIG. 24 shows a list of layout evaluation amounts according to this embodiment. As shown in FIG. 24, the layout evaluation amounts used in this embodiment can mainly be divided into there categories.

The first evaluation category includes the evaluation amounts of each image. The evaluation amounts are used to judge states such as the brightness, saturation, and blur amount of an image and score the states. An example of scoring will be described below.

Figure 25:
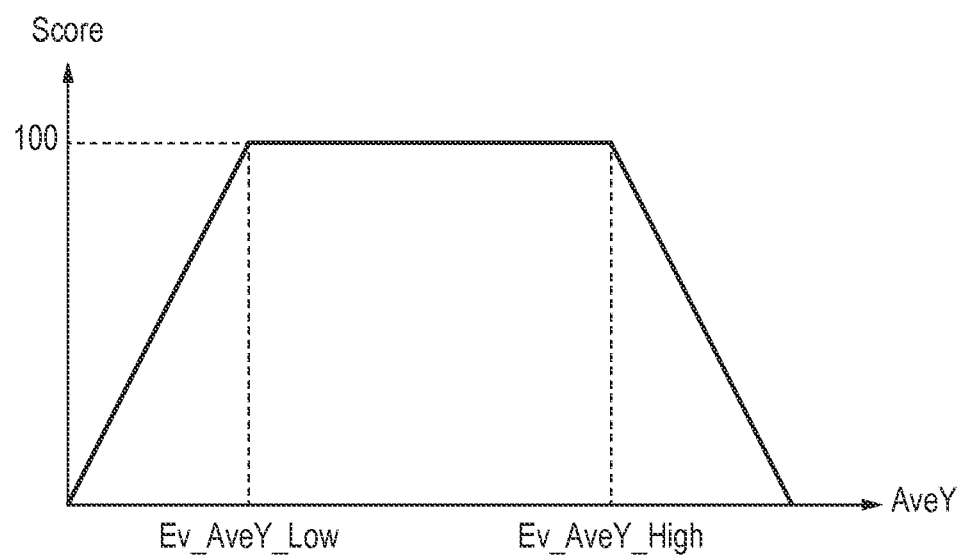
FIG. 25 is a graph for explaining a method of calculating brightness appropriateness.
Figure 26:
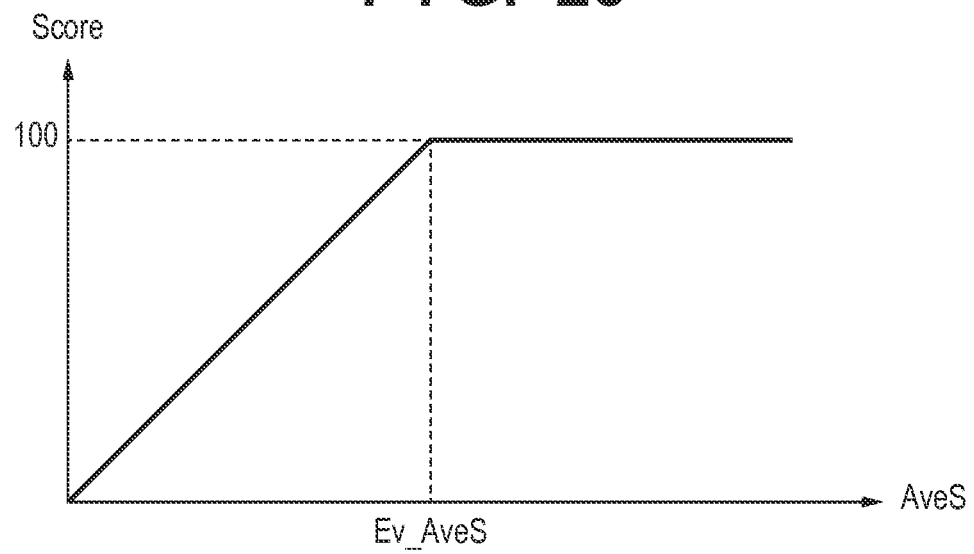
FIG. 26 is a graph for explaining a method of calculating saturation appropriateness.

FIG. 25 shows the brightness appropriateness. In the graph of FIG. 25, the ordinate represents the score, and the abscissa represents the average luminance (AveY). Referring to FIG. 25, the brightness appropriateness scores 100 when the average luminance falls within a predetermined range. The score is set so as to be lower than 100 outside the predetermined range. FIG. 26 shows the saturation appropriateness. In the graph of FIG. 26, the ordinate represents the score, and the abscissa represents the average saturation (AveS). Referring to FIG. 26, the saturation appropriateness scores 100 when the average saturation of the entire image is larger than a predetermined saturation value. The score is set so as to gradually decrease when the average saturation is smaller than the predetermined value.

The second evaluation category scores evaluation of matching between an image and a slot. Examples of evaluation of the image/slot matching are person matching and trimming loss determination. The person matching represents the matching ratio of a person designated for a slot to a person who exists in the image actually arranged in the slot. For example, assume that "father" and "son" are designated for a slot by the PersonGroup tag designated by XML. At this time, when the two persons are included in the image assigned to the slot, the person matching of the slot scores 100. If only one of the persons is included, the matching scores 50. If neither person is included, the matching scores 0. The matching in a page is the average value of the matchings calculated for the respective slots.

Figures 27, 28:
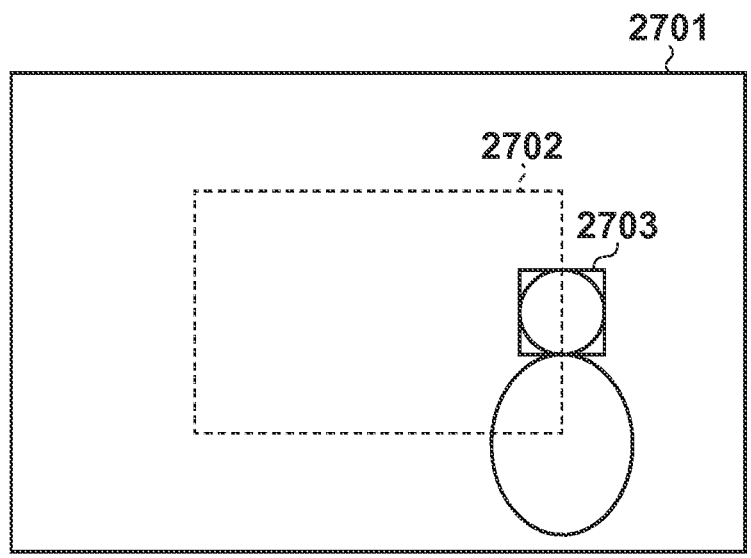
FIG. 27 is a view for explaining trimming loss determination processing.
FIG. 28 is a table for explaining image similarity determination processing.

Another image/slot matching evaluation value is loss determination of a trimming region 2702. For example, when loss of a face region 2703 is known from the relationship between the face region 2703 existing in the image and the trimming region 2702, as shown in FIG. 27, scores of 0 to 100 are calculated in accordance with the area of the lost portion. If the lost area of the face region is 0, the score is 100. Conversely, if the whole face region is lost, the score is 0.

The third evaluation category evaluates the balance in a layout page. FIG. 24 shows image similarity, tone variation, and face size variation as the evaluation values used to evaluate the balance.

The image similarity will be described first. As the image similarity, the similarity between the images is calculated for each of the enormous number of generated temporary layouts. For example, if only similar images that resemble each other are arranged at the time of creating a layout of theme "travel", the layout may be not good. For example, the similarity can be evaluated by the shooting date/time. If the shooting dates/times of images are close, there is a high possibility that the images were shot at similar places. However, if the shooting dates/times are far off, both the scenes and the places are different at a high possibility.

The shooting date/time can be acquired from the attribute information of each image, which is saved in the database portion 202 in advance as image attribute information, as shown in FIG. 11. To obtain the similarity from the shooting dates/times, the following calculation is performed.

For example, assume that four images as shown in FIG. 28 are laid out in the temporary layout of interest. Note that in FIG. 28, capturing date/time information is added to each image specified by an image ID. More specifically, year/month/day and time (Christian Era year: YYYY, month: MM, day: DD, hour: HH, minute: MM, and second: SS) are added as a capturing date/time. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is obtained. A similarity evaluation value Similarity[l] of the lth temporary layout can be obtained by Similarity[$l$]=100×$st$MinInterval[$l$]/MaxMinInterval That is, the value Similarity[l] is effective as the image similarity evaluation value because it is close to 100 as the minimum capturing time interval becomes large, and close to 0 as the time interval becomes small.

The tone variation will be explained next as the evaluation value used to evaluate the balance in a layout page. For example, if only images of similar colors (for example, blue of a blue sky, green of a mountain) are arranged at the time of creating a layout of theme "travel", the layout may be not good. Hence, the variance of the average hues AveH of images existing in the lth temporary layout of interest is calculated and stored as a hue variation tmpColorVariance[l]. A maximum value MaxColorVariance in tmpColorVariance[l] is obtained. A color variation evaluation value ColorVariance[l] of the lth temporary layout can be obtained by ColorVariance[$l$]=100×$tmp$ColorVariance[$l$]/MaxColorVariance That is, the value ColorVariance[l] is effective as the hue variation evaluation value because it is close to 100 as the variation of the average hues of the images arranged in a page becomes large, and close to 0 as the variation of the average hues becomes small.

The face size variation will be explained next as the evaluation value used to evaluate the balance in a layout page. For example, if only images of similar face sizes are arranged in a layout result at the time of creating a layout of theme "travel", the layout may be not good. Assume that a good layout is obtained when images of a variety of face sizes, including small and large face sizes on a paper sheet after layout, are arranged in balance. In this case, the face size variation is set large. Hence, the variance of face sizes (the diagonal distance from the upper left to the lower right of a face position) arranged in the lth temporary layout of interest is stored as tmpFaceVariance[l]. A maximum value MaxFaceVariance in tmpFaceVariance[l] is obtained. A face size variation evaluation value FaceVariance[l] of the lth temporary layout can be obtained by FaceVariance[*l*]=100×*tmp*FaceVariance[*l*]/MaxFaceVariance That is, the value FaceVariance[l] is effective as the face size variation evaluation value because it is close to 100 as the variation of the face sizes arranged on a paper sheet becomes large, and close to 0 as the variation of the face sizes becomes small.

As another category, user taste evaluation is usable.

The plurality of evaluation values described above, which are calculated for each temporary layout, will be integrated and referred to as a layout evaluation value for each temporary layout hereinafter. Let EvalLayout[l] be the integrated evaluation value of the lth temporary layout, and EvalValue[n] be N evaluation values (including the evaluation values shown in FIG. 24) calculated above. At this time, the integrated evaluation value can be obtained by $$EvalLayout\ [l] = \sum_{n=0}^{N} EvalValue\ [n] \times W[n]$$

where W[n] is the weight of each evaluation value of shown in FIG. 24 for each scene. As a characteristic feature, a different weight is set for each layout theme. For example, the themes "growth" and "travel" are compared, as shown in FIG. 24. For the theme "travel", a number of photos whose quality is as high as possible are laid out in a variety of scenes. Hence, settings are done to emphasize the individual evaluation values of the images and the in-page balance evaluation values. On the other hand, for "growth", whether the main character as the growth target properly matches each slot is more important than the image variation. Hence, settings are done to emphasize the image/slot matching evaluation than in-page balance or the individual evaluation of images.

In step S2109, a layout list LayoutList[k] for layout result display is generated using EvalLayout[l] calculated in the above-described way. For the layout list, an identifier l is stored in descending order of evaluation value out of EvalLayout[l] for a predetermined number of (for example, five) layouts. For example, if the temporary layout created for the 50th time has the highest score, layout list LayoutList[0]=50. Similarly, after the layout list LayoutList[1], the identifier l for the second highest score is stored.

The flowchart of FIG. 21 has been described above. Note that in this embodiment, the layout images are sequentially displayed on the display device in the display order based on the layout list LayoutList[k] created by the processing shown in FIG. 21. More specifically, the similarity between a plurality of layouts that are successive in the order of LayoutList[k] is determined. Upon determining that the layouts are not similar to each other, the images of the plurality of layouts are continuously displayed. On the other hand, upon determining that the plurality of layouts are similar, the layouts are displayed in a display order different from the order in the layout list. Details will be described later with reference to FIG. 34.

Figure 29:
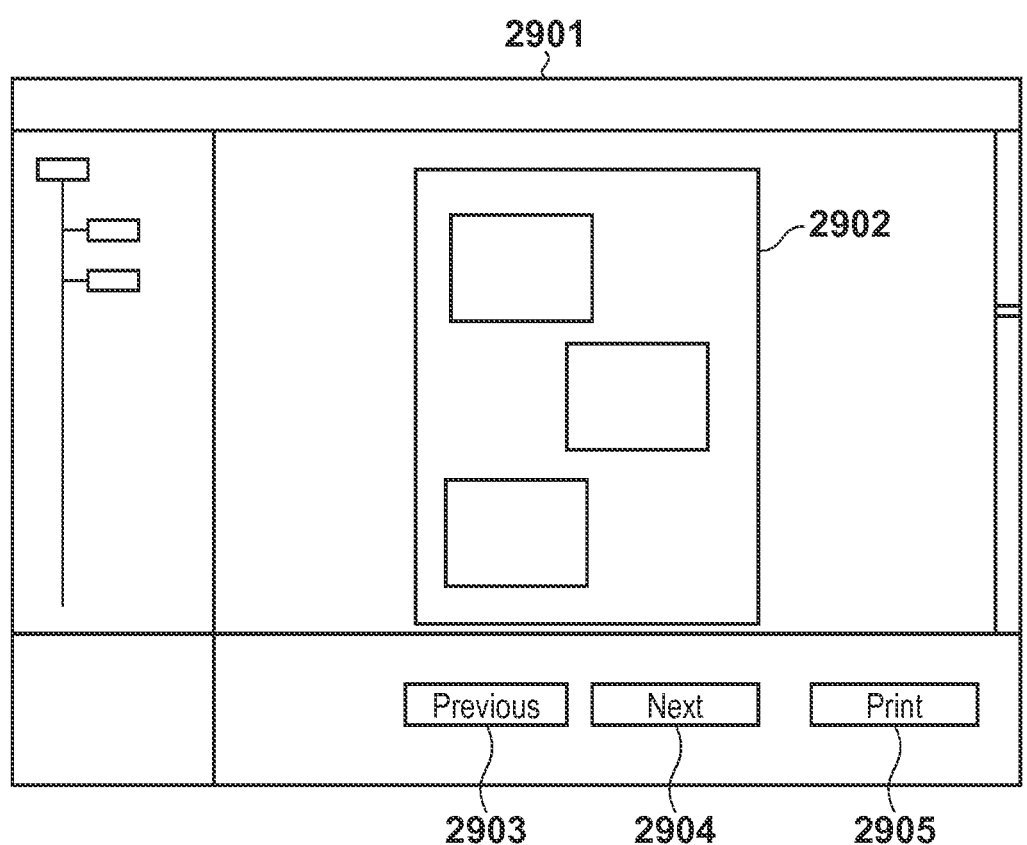
FIG. 29 is a view showing a display example of an automatic layout generation result.

Next, the layout result obtained by the above-described processing is rendered in step S605 of FIG. 6 and displayed, as in a UI 2901 shown in FIG. 29. In step S605, the layout identifier stored in LayoutList[0] is read out, and the temporary layout result corresponding to the identifier is read out from the secondary storage device 103 or RAM 102. In the layout result, as described above, template information and image names assigned to the respective slots existing in the template are set. In step S605, the layout result is rendered based on these pieces of information using the rendering function of the OS operating on the information processing apparatus 115 and displayed, as indicated by a layout 2902 in FIG. 29.

When the user presses a Next button 2904 in FIG. 29, the identifier of layout list LayoutList[1] of the next score is read out. The layout result is rendered and displayed in the same manner as described above. This allows the user to view variations of proposed layouts. The user can also redisplay the layout displayed previously by pressing a Previous button 2903. If the user likes the displayed layout, he/she can press a Print button 2905 to cause the printer 112 connected to the information processing apparatus 115 to print the layout 2902.

The basic processing procedure according to this embodiment has been described above.

A more detailed embodiment out of the embodiments will be described below in association with variations of proposed layouts.

When scoring a plurality of layouts and sequentially switching and displaying the layout in the order of score, similar layouts may continue because of the same layout evaluation criterion. This will be described with reference to, for example, FIG. 33.

Figure 33:
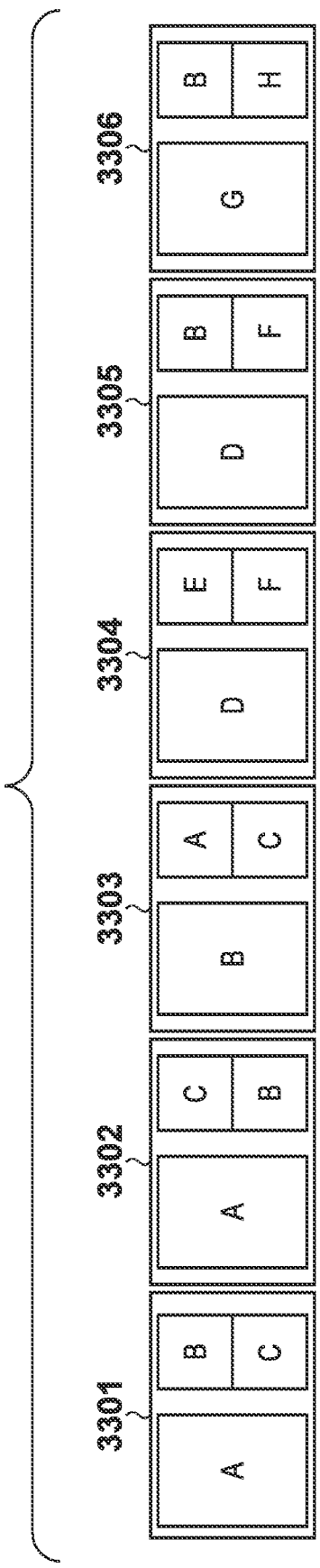
FIG. 33 is a view showing an example in which layouts generated by a layout generation portion are arranged in the order of score.

FIG. 33 shows a result obtained by arranging layouts generated by the layout generation portion 205 in the order of score. Referring to FIG. 33, reference numerals 3301 to 3306 denote layout states in which eight images A to H are assigned to three slots. The layout evaluation values of the layouts 3301 to 3306 shown in FIG. 33 are as follows.
The layout evaluation value of the layout 3301 is 90.
The layout evaluation value of the layout 3302 is 85.
The layout evaluation value of the layout 3303 is 80.
The layout evaluation value of the layout 3304 is 75.
The layout evaluation value of the layout 3305 is 70.
The layout evaluation value of the layout 3306 is 55.

As is apparent from FIG. 33, the three images used in the layout 3301 having the highest layout evaluation value and the three images used in the layout 3302 having the second highest layout evaluation value are identical but are arranged differently.

For example, assume that the images A, B, and C are judged to be important among the eight images. As the number of images A, B, and C arranged in the slots increases, the layout evaluation value naturally rises. Hence, similar layouts may continue.

Since the layout list in FIG. 21 is automatically created, a layout generated by combining images of high evaluation values does not necessarily satisfy the user. In this case, the user can switch the layout image displayed on the display device 104 by intentionally pressing the Next button 2904 shown in FIG. 29. However, if layout images undesirable for the user are continuously displayed, the user needs to press the Next button 2904 every time the layout image is displayed. For this reason, it may be impossible to easily display the desired layout image.

In this embodiment, layout information to be displayed next is changed in consideration of the layout information of the next display target, thereby controlling the layout so as not to continuously display similar layouts. Display control processing of this embodiment will be described below.

Figure 34:
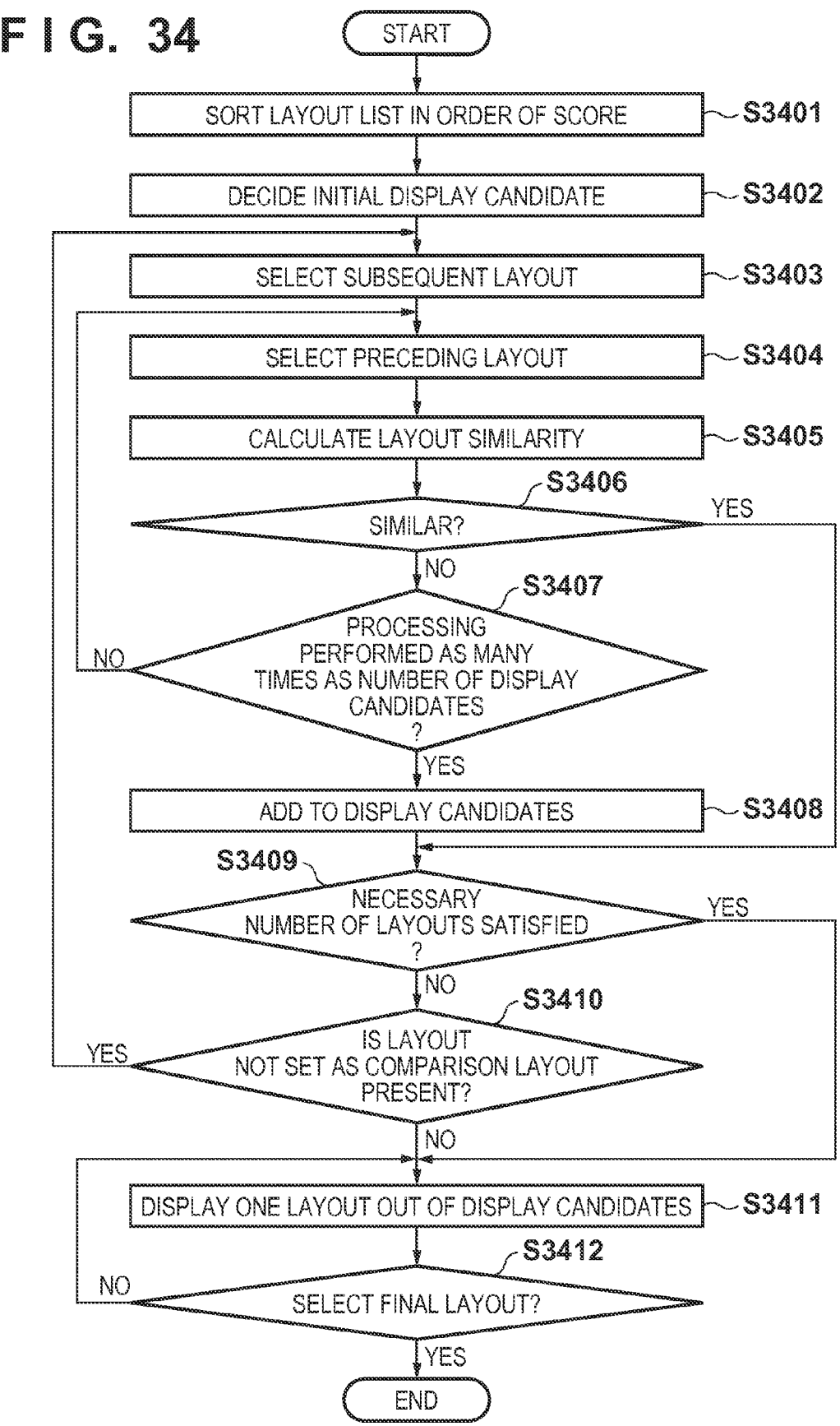
FIG. 34 is a flowchart of processing of controlling layouts such that similar layouts do not continue according to the first embodiment.

FIG. 34 is a flowchart of processing of controlling layouts such that similar layouts do not continue according to this embodiment. In this embodiment, the processing procedure is implemented by causing the CPU 100 to execute a program stored in the ROM 101 or the like.

Referring to FIG. 2, image information acquisition processing of acquiring a plurality of pieces of image information is performed, and the layout generation portion 205 generates a number of layouts from the acquired image information.

In step S3401, the CPU 100 sorts the pieces of layout information in the layout list created by the processing shown in FIG. 21, which are generated by the layout generation portion 205, in the order of score of the layout evaluation value based on the layout evaluation value calculation result. For example, in FIG. 33, the layouts 3301 to 3306 are obtained as the result of sorting the layout information in the order of score of the layout evaluation value.

In step S3402, the CPU 100 adds the layout information of the highest score out of the layout evaluation values to the display candidate list and decides it as the initial display candidate. For example, in FIG. 33, the layout 3301 is added to the display candidate list.

In step S3403, the CPU 100 selects the layouts that are not included in the display candidate list one by one in accordance with the layout order in the layout list sorted in step S3401. The layout selected in step S3403 will be described below as a "subsequent layout".

Every time subsequent layout selection processing is invoked, the CPU 100 selects one of the plurality of layouts sorted in the order of score as a subsequent layout. For example, in the example shown in FIG. 33, the layouts 3302, 3303, 3304, 3305, and 3306 are sequentially selected one by one as the subsequent layout.

In step S3404, the CPU 100 selects one layout from the display candidate list. The layout selected here will be described below as a "preceding layout". Note that in this specification, the subsequent layout and the preceding layout will also be referred to as a first layout and a second layout, respectively, for the descriptive convenience.

The CPU 100 selects one layout from the display candidate list as the preceding layout. For example, in FIG. 33, since only the layout 3301 is registered in the display candidate list at this point of time, the layout 3301 is selected as the preceding layout.

In step S3405, the CPU 100 compares the selected preceding layout with the subsequent layout and calculates a layout similarity evaluation value. For example, the ratio of the number of identical images used in the preceding layout and the subsequent layout to the number of slots arranged in the layouts is calculated as the layout similarity evaluation value.

The calculation method will be expressed as a formula below.

$$\text{layout similarity evaluation value} = \text{number of images commonly used in two layouts}/\text{number of slots} \times 100$$

For example, in FIG. 33, the CPU 100 compares the layout 3301 serving as the preceding layout and the layout 3302 serving as the subsequent layout and calculates the layout similarity evaluation value. In the layouts 3301 and 3302, the number of slots is 3, and the number of common images is 3. Hence, the layout similarity evaluation value is obtained as $$\text{layout similarity evaluation value} = 3/3 \times 100 = 100.$$

In step S3406, the CPU 100 performs threshold determination of the layout similarity evaluation value using a preset layout similarity evaluation value threshold. If the layout similarity evaluation value does not exceed the preset layout similarity evaluation value threshold (NO in step S3406), it is determined that the layouts are not similar, and the process advances to step S3407. If the layout similarity evaluation value exceeds the preset layout similarity evaluation value threshold (YES in step S3406), it is determined that the layouts are similar, and the process advances to step S3409.

For example, in FIG. 33, assume that the preset layout similarity evaluation value threshold is 70. The preceding layout is the layout 3301. The subsequent layout is the layout 3302. Since the layout similarity evaluation value calculated in step S3405 is 100 which exceeds the layout similarity evaluation value threshold "70", it is determined that the layouts are similar. Since processing in step S3408 to be described later is not executed, the layout 3302 is not added to the display candidate list.

Upon determining that the subsequent layout is not similar to the preceding layout (NO in step S3406), the CPU 100 determines in step S3407 whether a layout not compared with the subsequent layout exists in the display candidate list. If a layout not compared with the subsequent layout is present (NO in step S3407), the process returns to step S3404. In step S3404, a layout immediately before the layout remaining in the display candidate list is set as the preceding layout, and the processing is repeated.

When all layouts in the display candidate list have been compared with the subsequent layout (YES in step S3407), the process advances to step S3408. Advancing to step S3408 indicates that it has been determined as the result of comparison between the subsequent layout and all layouts in the display candidate list that the display candidate list includes no layout similar to the subsequent layout. Then, the processes of steps S3404 to S3407 are repeated as many times as the number of layouts included in the display candidate list.

For example, in FIG. 33, assume that only the layout 3301 is registered in the display candidate list. In this case, if it is determined in step S3406 that the layout 3301 as the preceding layout and the layout 3302 as the subsequent layout are not similar, comparison between the subsequent layout and all layouts in the display candidate list is completed, and the process advances to step S3408.

In step S3408, the CPU 100 adds the subsequent layout selected in step S3403 to the display candidate list. In the processes of steps S3405 to S3407, the subsequent layout is determined to be dissimilar to all layouts already registered in the display candidate list. For this reason, in step S3408, it is possible to add the subsequent layout dissimilar to the layouts existing in the display candidate list out of the layouts included in the layout list. When the layout is added to the display candidate list in step S3408, the process advances to step S3409.

In step S3409, the CPU 100 determines whether the number of layouts registered in the display candidate list satisfies the preset necessary number of layouts. If the preset necessary number of layouts is satisfied (YES in step S3409), the process advances to step S3411. If the preset necessary number of layouts is not satisfied (NO in step S3409), the process advances to step S3410.

For example, the preset necessary number of layouts is assumed to be 3. In this case, the processes of steps S3403 to S3410 are repeated, and when the number of layouts sequentially registered in the display candidate list has reached 3, the process advances to step S3411.

In this embodiment, the necessary number of layouts is preset. However, the present invention is not limited to this. For example, the necessary number of layouts may be calculated based on the relationship between the number of images of the plurality of pieces of image information and the number of regions to arrange images on the template. If the number of images of the plurality of pieces of image information is 10, and the number of regions to arrange images on the template is 3, a value obtained by dividing the number of images of the plurality of pieces of image information by the number of regions to arrange images on the template may be set as the necessary number of layouts. In this case, the necessary number of layouts is 3.

Alternatively, for example, the number of images in which a person is detected as the result of image analysis may be calculated, and the necessary number of layouts may be based on the ratio of the number of images including detected persons to the number of regions to arrange images on the template. If the number of images including detected persons is 10, the number of regions to arrange images on the template is 4, and the ratio of arranging a person is 50%, at least two images including detected persons need to exist on the template. In this case, the number of images (10) of the plurality of pieces of image information is divided by the number of images (2) including detected persons, and the resultant value "5" is set as the necessary number of layouts.

Hence, the necessary number of layouts can be either preset or calculated by any method using information input to this processing, such as images, image analysis information, or templates.

In step S3410, the CPU 100 determines whether a layout not set as the subsequent layout that is a layout to be compared with the preceding layout remains in the layouts not added to the display candidate list. If a layout not set as the subsequent layout that is a layout to be compared with the preceding layout still exists (YES in step S3410), the process returns to step S3403. If a layout not set as the subsequent layout that is a layout to be compared with the preceding layout is absent (NO in step S3410), the process advances to step S3411.

In step S3411, the CPU 100 selects one of the layouts added to the display candidate list in the processes up to step S3410, renders the selected layout in step S605 of FIG. 6 described above, and displays it as shown in FIG. 29. The process then advances to step S3412.

The user confirms the displayed layout. If the user likes the displayed layout, it can be printed by pressing the Print button 2905 shown in FIG. 29. If the user does not like the displayed layout, another layout can be displayed by pressing the Next button 2904 shown in FIG. 29 described above. Upon accepting an instruction of the Print button 2905 (YES in step S3412), data corresponding to the selected layout is printed. Upon accepting an instruction of the Next button 2904 (NO in step S3412), the process returns to step S3411 to select another layout from the display candidate list, and the display processing is repeated.

Note that when the processing has been repeated as many times as the number of layouts in the display candidate list, the layout displayed first is redisplayed. Alternatively, the processing may end, determining that no candidate exists.

The processes of step S3401 to S3412 will be described with reference to, for example, FIG. 33.

In step S3401, based on the layout evaluation values of layouts generated by layout generation processing, the layouts are sorted in the order of score of the layout evaluation value. FIG. 33 shows the result of sorting in the order of score from left to right. In step S3402, the layout 3301 of the highest score is stored in the display candidate list.

In step S3403, the layout 3302 having the highest score next to the layout 3301 sorted in the order of score is selected as the subsequent layout. In step S3404, the layout 3301 is selected from the display candidate list as the preceding layout. In step S3405, the layout similarity evaluation value between the layout 3301 as the preceding layout and the layout 3302 as the subsequent layout is calculated by the above-described layout similarity evaluation value calculation method. Since all the images included in the layouts are identical, the layout similarity evaluation value is calculated as 100.

In step S3406, the preset layout similarity evaluation value threshold is 70. Since the layout similarity evaluation value calculated in step S3405 is larger than the threshold, the layouts are determined to be similar, and the process advances to step S3409. In step S3409, the preset necessary number of layouts is 3. At this point of time, the layout 3301 is the only one layout registered in the display candidate list. For this reason, it is determined that the necessary number of layouts is not satisfied yet, and the process advances to step S3410.

In step S3410, since four layouts (layouts 3303 to 3306) not compared with the layout registered in the display candidate list remain, the process returns to step S3403.

In step S3403, the layout 3303 having the highest score next to the layout 3302 sorted in the order of score is selected as the subsequent layout. In step S3404, the layout 3301 is selected from the display candidate list as the preceding layout. In step S3405, the layout similarity evaluation value between the layout 3301 as the preceding layout and the layout 3303 as the subsequent layout is calculated by the above-described layout similarity evaluation value calculation method. Since all the images included in the layouts are identical, the layout similarity evaluation value is calculated as 100.

In step S3406, the preset layout similarity evaluation value threshold is 70. Since the layout similarity evaluation value calculated in step S3405 is larger than the threshold, the layouts are determined to be similar, and the process advances to step S3409. In step S3409, the preset necessary number of layouts is 3. At this point of time, the layout 3301 is the only one layout registered in the display candidate list. For this reason, it is determined that the necessary number of layouts is not satisfied yet, and the process advances to step S3410.

In step S3410, since three layouts (layouts 3304 to 3306) not compared with the layout registered in the display candidate list remain, the process returns to step S3403.

In step S3403, the layout 3304 having the highest score next to the layout 3303 sorted in the order of score is selected as the subsequent layout. In step S3404, the layout 3301 is selected from the display candidate list as the preceding layout.

In step S3405, the layout similarity evaluation value between the layout 3301 as the preceding layout and the layout 3304 as the subsequent layout is calculated by the above-described layout similarity evaluation value calculation method. In this case, since all the images included in the layouts are different, the layout similarity evaluation value is calculated as 0. In step S3406, the preset layout similarity evaluation value threshold is 70. Since the layout similarity evaluation value calculated in step S3405 is smaller than the threshold, the layouts are determined to be dissimilar, and the process advances to step S3407.

In step S3407, since the layout 3301 is the only one layout currently registered in the display candidate list, it is determined that the comparison has ended as many times as the number of layouts registered in the display candidate list, and the process advances to step S3408. In step S3408, the layout 3304 determined to be dissimilar is added to the display candidate list.

The processes of steps S3403 to S3410 are repeated in this way, thereby creating a display candidate list representing the display target layout when sequentially displaying layouts. At this time, layouts that are determined to be dissimilar to the layout already registered in the display candidate list are registered. That is, it is possible to create a display candidate list by the processing shown in FIG. 34 so as not to include a plurality of layouts similar to each other. Note that in the example shown in FIG. 34, the subsequent layout is compared with all layouts (preceding layouts) included in the display candidate list by the processing of step S3407. However, the present invention is not limited to this, and the processing of step S3407 is not always necessary. That is, in step S3404, a layout added latest may be selected and compared with the subsequent layout. In this case, the display candidate list is created such that at least two layouts that are successive in the display candidate list do not become similar.

Figure 35:
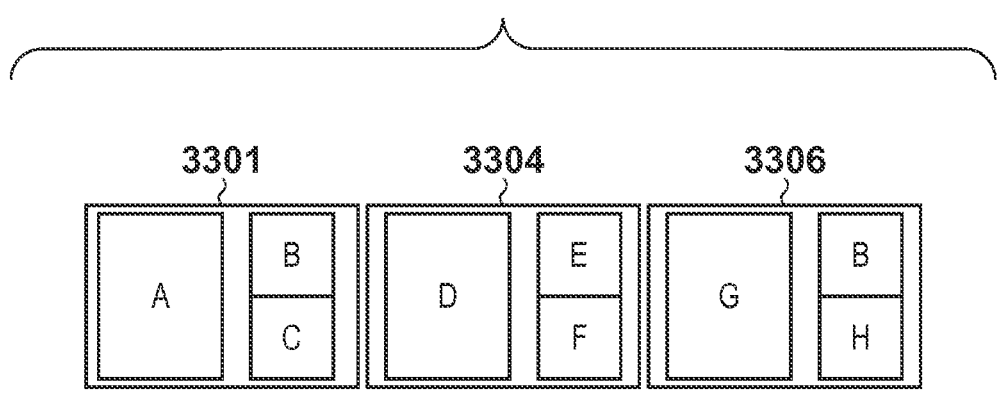
FIG. 35 is a view showing an example of final layouts registered in a display candidate list according to the first embodiment.

FIG. 35 shows a result obtained by repeating the processes of steps S3403 to S3410 in FIG. 34 for the plurality of layouts shown in FIG. 33.

FIG. 35 shows final layout results registered in a display candidate list. Referring to FIG. 35, the processes of steps S3403 to S3410 are repeated, and consequently, the layouts 3301, 3304, and 3306 are finally registered in the display candidate list.

If the number of layouts registered in the display candidate list satisfies the necessary number of layouts (YES in step S3409), or a layout not compared with the preceding layout does not remain any more (NO in step S3410), the process advances to step S3411.

In steps S3411 and S3412, the layouts in the display candidate list are sequentially displayed. At this time, every time the user presses the Next button 2904 shown in FIG. 29 described above, the displayed layout is switched to a different one. When the user presses the Print button 2905, the layout to be used is finally decided.

As described above, in this embodiment, when sequentially displaying the layouts, it is possible to display a layout dissimilar to a layout displayed previously. Hence, various layouts can be presented to the user. In addition, when selecting a desired layout from the layouts displayed on the display device, the user can easily select the desired layout because various layouts are sequentially displayed.

In this embodiment, to prevent the preceding and subsequent layouts from becoming similar when sequentially displaying the layouts, control is performed such that images used in the previously displayed layout are included in the layout to be displayed subsequently at less than a predetermined ratio. Hence, the arranged images readily change between the layouts, as shown in FIG. 35, and a display candidate list having a great variety in which similar layouts hardly continue can be generated.

Note that in this embodiment, the subsequent layout is prohibited from including the images used in the preceding layout in the display order at a predetermined ratio or more. However, the present invention is not limited to this. For example, control may be done not to include the same images in the preceding and subsequent layouts in the display order.

Alternatively, control may be done such that the preceding and subsequent layouts include common images in a number equal to or smaller than a predetermined number.

In this embodiment, the display order is decided such that similar layouts do not continue using similarity based on images included in two layouts that are successive in the display order. However, the method of determining the similarity need not always be used. A layout having an evaluation value different from that of the preceding layout may be selected as the next layout. Alternatively, the next layout may be selected based on a selection criterion different from that used to select the preceding layout.

The first embodiment has been described above.

<Second Embodiment>

In the first embodiment, it is possible to provide a layout generation apparatus capable of ensuring a variety of layouts in which similar layouts hardly continue by controlling the layout to be selected next using previously generated layout result information when selecting a layout. In the following case, however, a new measure is necessary.

In the first embodiment, the three finally selected layouts shown in FIG. 35 are the layouts 3301, 3304, and 3306. Their layout evaluation values are as follows.

For example, the layout evaluation value of the layout 3301 is 90, the layout evaluation value of the layout 3304 is 75, and the layout evaluation value of the layout 3306 is 55. Especially, the layout 3306 has the layout evaluation value "55" that is considerably smaller than those of the remaining layouts, as is apparent.

In the first embodiment, although a variety of layouts in which no similar layouts continue can be provided, a layout having a low layout evaluation value may be selected.

Hence, when selecting a layout, control is performed in consideration of the layout evaluation value in addition to performing control to prevent a layout displayed previously and a layout to be displayed next from becoming similar. This method will be described below.

Figure 36:
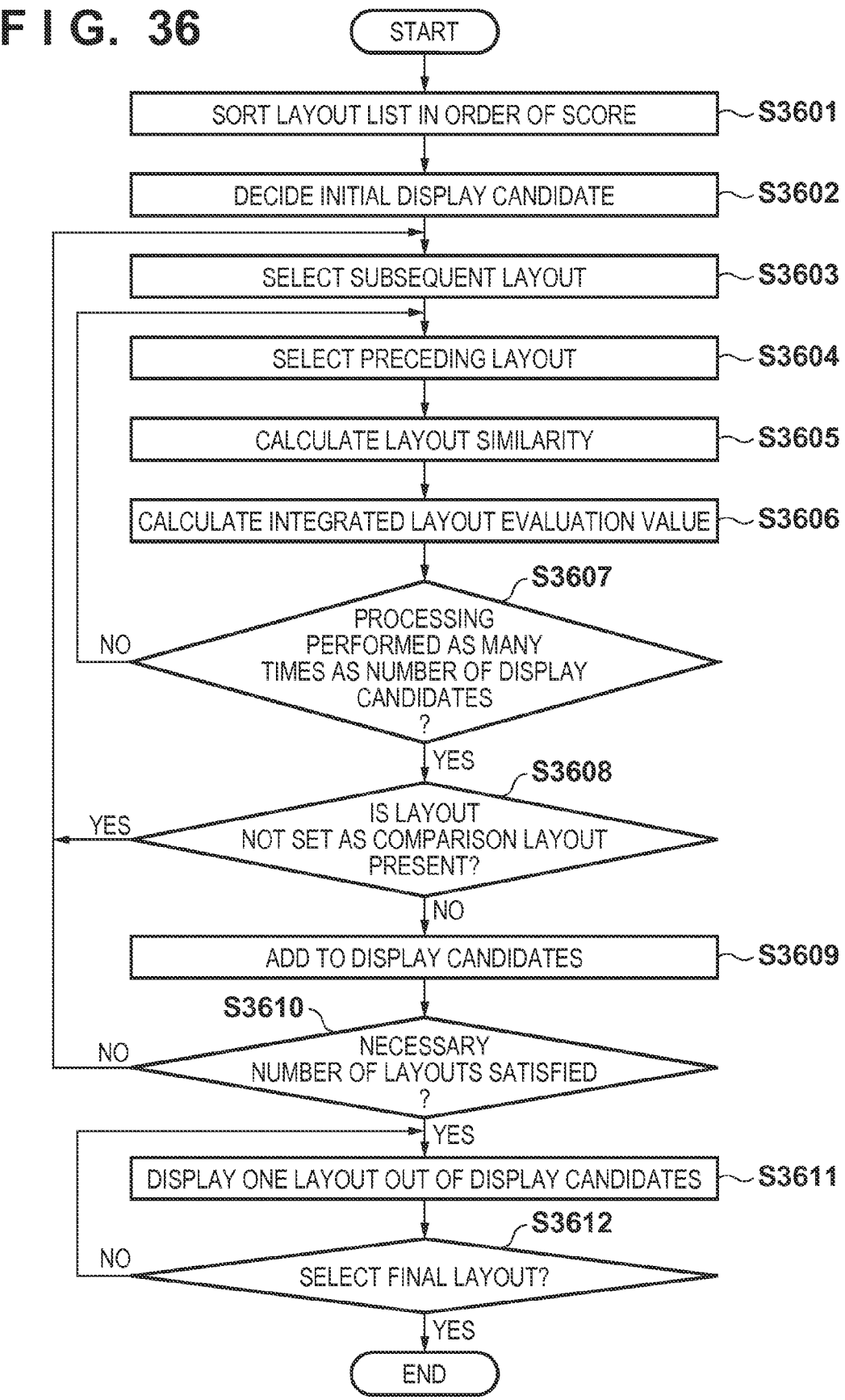
FIG. 36 is a flowchart of processing of controlling using a layout similarity evaluation value and a layout evaluation value according to the second embodiment.

FIG. 36 is a flowchart showing a processing procedure of controlling using a layout similarity evaluation value and a layout evaluation value according to this embodiment. Referring to FIG. 36, a description of processes whose contents are the same as those described with reference to FIG. 34 will be omitted. Steps S3601 to S3605 are the same as steps S3401 to S3405 in FIG. 34, and a description thereof will be omitted.

In step S3606, a CPU 100 calculates the integrated layout evaluation value of the subsequent layout using a layout similarity evaluation value calculated in step S3605 and the layout evaluation value of each layout calculated by a layout generation portion 205.

The integrated layout evaluation value of the subsequent layout is calculated using weights preset for the layout similarity evaluation value and the layout evaluation value.

First, the width of the layout similarity evaluation value and that of the layout evaluation value are made to match. For example, known normalization processing is performed such that both the layout similarity evaluation value and the layout evaluation value become 0 to 100. Alternatively, the layout similarity evaluation value and the layout evaluation value may be calculated in advance within the range of 0 to 100.

Using a preset weight M of the layout evaluation value and a weight N of the layout similarity evaluation value, the integrated layout evaluation value is calculated by integrated layout evaluation value=layout evaluation value×$N$+(100−layout similarity evaluation value)×$M$ For example, assume that a layout 3301 in FIG. 33 is the preceding layout, and a layout 3302 is the subsequent layout. In this case, the integrated layout evaluation value is calculated assuming the layout evaluation value of the layout 3302 is 85, and the layout similarity evaluation value is 100. When the preset weight M of the layout evaluation value is 1.0, and the weight N of the layout similarity evaluation value is 0.2, the integrated layout evaluation value is obtained by integrated layout evaluation value=85×1.0+(100−100)×0.2=85

The calculated integrated layout evaluation value of the subsequent layout is saved in a memory together with association information to the subsequent layout.

In step S3607, if a layout not compared with the subsequent layout still exists in the display candidate list (NO in step S3607), the CPU 100 returns the process to step S3604 and replaces the preceding layout with the remaining layout. The CPU 100 repeats steps S3604 to S3607 and calculates the integrated layout evaluation value of the subsequent layout.

At this time, in step S3606, the integrated layout evaluation value already saved in the memory is compared with the newly calculated integrated layout evaluation value. The integrated layout evaluation value is replaced with the lower one and saved in the memory together with association information to the subsequent layout. When all layouts in the display candidate list have been compared with the subsequent layout, the process advances to step S3608.

The integrated layout evaluation value finally saved in the memory is used as the integrated layout evaluation value of the subsequent layout.

In step S3608, the CPU 100 determines whether a layout not set as the subsequent layout and compared with the preceding layout remains. If a layout not compared exists (YES in step S3608), the process returns to step S3603 to select the layout not compared as the subsequent layout and continue the processing. If a layout not compared is absent (NO in step S3608), it is determined that no layout to be set as the subsequent layout exists, and the process advances to step S3609. Steps S3603 to S3608 are repeated, thereby saving the integrated layout evaluation value associated with each layout in the memory.

For example, when the layout 3301 in FIG. 33 is the preceding layout, the integrated layout evaluation value is calculated for each of the layouts 3302 to 3306 as the subsequent layout.

In step S3609, the CPU 100 adds a layout having the highest score out of the integrated layout evaluation values associated with the respective layouts saved in the memory to the display candidate list, and advances to step S3610.

In step S3610, the CPU 100 determines whether the number of layouts registered in the display candidate list satisfies the preset necessary number of layouts. If the preset necessary number of layouts is not satisfied (NO in step S3610), the process returns to step S3603 to set a layout added to the display candidate list as the preceding layout, compare it with another layout as the subsequent layout again, and continue the processing. If the preset necessary number of layouts is satisfied (YES in step S3610), the process advances to step S3611.

In step S3611, the CPU 100 selects one of the layouts added to the display candidate list in the processes up to step S3610, renders the selected layout (step S605 of FIG. 6), and displays the result as shown in FIG. 29. The process then advances to step S3612.

In step S3612, the CPU 100 sequentially displays the layouts from the display candidate list. At this time, the user confirms the displayed layout. If the user likes the displayed layout, it can be printed by pressing a Print button 2905. If the user does not like the displayed layout, he/she presses a Next button 2904 in FIG. 29 described above, thereby displaying another layout. In this case, the process returns to step S3611 to select another layout from the display candidate list and repeat the processing.

The processes of steps S3601 to S3612 will be described with reference to, for example, FIG. 33. Steps S3601 to S3604 are the same as in the first embodiment, and a detailed description thereof will be omitted.

Out of the layouts shown in FIG. 33, the layout 3301 is registered in the display candidate list. Processing up to integrated layout evaluation value calculation will be described assuming that the layout 3301 is set as the preceding layout, and each of the layouts 3302 to 3306 is set as the subsequent layout.

In step S3605, layout similarity evaluation value calculation processing of each subsequent layout is performed, and the process advances to step S3606. The layout similarity evaluation value calculation results are as follows.

The layout 3302 scores 100. Layout similarity evaluation value=3/3×100=100

The layout 3303 scores 100. Layout similarity evaluation value=3/3×100=100

The layout 3304 scores 0. Layout similarity evaluation value=0/3×100=0

The layout 3305 scores 33. Layout similarity evaluation value=1/3×100=33

The layout 3306 scores 33. Layout similarity evaluation value=1/3×100=33

(The fractional portions are discarded).

In step S3606, the integrated layout evaluation value of each subsequent layout is calculated, and the process advances to step S3607. For example, the layout evaluation values of the subsequent layouts are as follows.

The layout 3302 scores 85.
The layout 3303 scores 80.
The layout 3304 scores 75.
The layout 3305 scores 70.
The layout 3306 scores 55.

When the preset weight M of the layout evaluation value is 1.0, and the weight N of the layout similarity evaluation value is 0.2, the integrated layout evaluation value results are as follows.

The layout 3302 scores 85. Calculation formula: 85×1.0+(100−100)×0.2=85

The layout 3303 scores 80. Calculation formula: 80×1.0+(100−100)×0.2=80

The layout 3304 scores 95. Calculation formula: 75×1.0+(100−0)×0.2=95

The layout 3305 scores 83. Calculation formula: 70×1.0+(100−33)×0.2=83

The layout 3306 scores 68. Calculation formula: 55×1.0+(100−33)×0.2=68

(The fractional portions are discarded).

In step S3607, the layout 3301 is the only one layout registered in the display candidate list. For this reason, it is determined that the comparison has ended as many times as the number of layouts registered in the display candidate list, and the process advances to step S3608.

In step S3608, for the above-described results, it is determined that the comparison between the preceding layout and each of the layouts 3302 to 3306 as the subsequent layout has ended, and the process advances to step S3609.

In step S3609, the layout 3304 having the highest score out of the integrated layout evaluation values of the subsequent layouts is added to the display candidate list. The process advances to step S3610.

In step S3610, if the necessary number of layouts is 3, the process returns to step S3603 to repeat the processing because only the two layouts 3301 and 3304 have been selected.

The process returns to step S3603 to repeat the processes of steps S3603 to S3610 again. At this time, the layouts 3301 and 3304 are registered in the display candidate list. Hence, the integrated layout evaluation values are calculated in each of a case in which the layout 3301 is set as the preceding layout and a case in which the layout 3304 is set as the preceding layout while setting, as the subsequent layout, each of the layouts other than that selected as the preceding layout.

First, the integrated layout evaluation values are calculated in the case in which the layout 3301 is set as the preceding layout, and each of the layouts 3302, 3303, 3305, and 3306 is set as the subsequent layout. The integrated layout evaluation values of the layouts have the same contents as those described above and will be omitted.

Next, the integrated layout evaluation values are calculated in the case in which the layout 3304 is set as the preceding layout, and each of the layouts 3302, 3303, 3305, and 3306 is set as the subsequent layout. The integrated layout evaluation value calculation results of the layouts are as follows.

The layout 3302 scores 100. Layout similarity evaluation value=0/3×100=0

The layout 3303 scores 100. Layout similarity evaluation value=0/3×100=0

The layout 3305 scores 33. Layout similarity evaluation value=2/3×100=66

The layout 3306 scores 33. Layout similarity evaluation value=0/3×100=0

(The fractional portions are discarded).

The integrated layout evaluation values are calculated based on the layout evaluation values and the layout similarity evaluation values of the layouts. The integrated layout evaluation values of the layouts are as follows.

The layout 3302 scores 105. Calculation formula: 85×1.0+(100−0)×0.2=105

The layout 3303 scores 100. Calculation formula: 80×1.0+(100−0)×0.2=100

The layout 3305 scores 76. Calculation formula: 70×1.0+(100−66)×0.2=76

The layout 3306 scores 75. Calculation formula: 55×1.0+(100−0)×0.2=75

(The fractional portions are discarded).

The sum of the integrated layout evaluation values is calculated for each of the layouts 3302, 3303, 3305, and 3306 as the subsequent layouts compared with the layouts 3301 and 3304 as the preceding layouts. The sums of the integrated layout evaluation values of the subsequent layouts are as follows.

The layout 3302 scores 85+105=190
The layout 3303 scores 80+100=180
The layout 3305 scores 83+76=159
The layout 3306 scores 68+75=143

Figure 37:
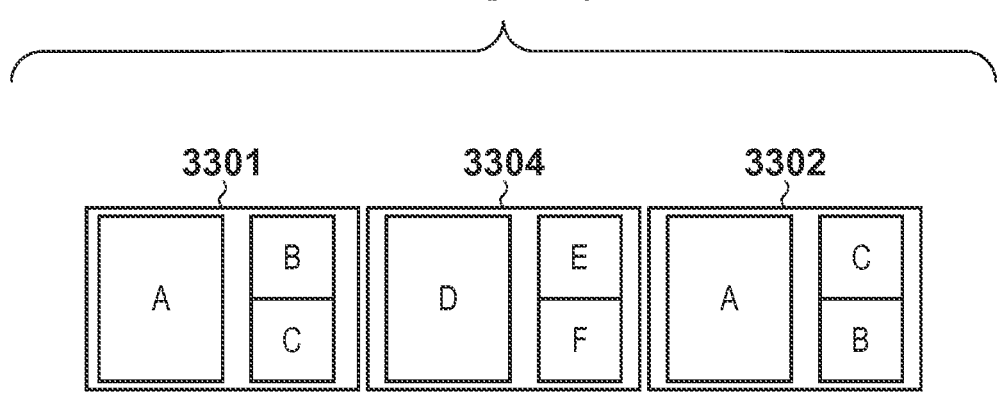
FIG. 37 is a view showing an example of final layouts registered in a display candidate list according to the second embodiment.

The layout 3302 having the highest score out of the integrated layout evaluation values calculated for the respective layouts is added to the display candidate list. FIG. 37 shows final layout results registered in the display candidate list out of the plurality of layouts shown in FIG. 33.

As described above, the processes of steps S3601 to S3610 are repeated, and consequently, the layouts 3301, 3304, and 3302 shown in FIG. 37 are saved as the final display candidate list, and the process advances to step S3611.

In steps S3611 and S3612, every time the user presses the Next button 2904 shown in FIG. 29 described above, the display is switched, and the user finally decides the layout to be used from the display candidate list.

As described above, in this embodiment, when sequentially displaying the layouts, it is possible to control so as to prevent a layout displayed previously from becoming similar to a layout displayed subsequently.

In addition, performing control in consideration of the layout evaluation value according to this embodiment makes it possible to provide a variety of layouts so as not to continuously display similar layouts while considering a layout having a high layout evaluation value.

The second embodiment has been described above.

<Third Embodiment>

In the first and second embodiments, processing of selecting a layout as a display candidate after the layout generation portion 205 has generated a plurality of layouts has been described. That is, a method of controlling to prevent preceding and subsequent layouts from becoming similar when deciding the display order of a plurality of layouts after generation of the plurality of layouts has been described. However, not after but at the time of layout generation, a layout may be generated while preventing it from becoming similar to already generated layouts.

In this embodiment, a method of providing a variety of layouts in which similar layouts hardly continue by using previously generated layout result information when generating layouts will be explained.

When generating an enormous number of temporary layouts in step S2107 of FIG. 21, processing of deciding the above-described parameters at random and arbitrarily applying a plurality of pieces of image information to regions (slots) to arrange images on an acquired template is repeated.

At this time, control is performed such that images used in the previously generated layout are included in the layout to be generated next at less than a predetermined ratio.

For example, assume that the predetermined ratio is 50%, the number of images of the plurality of pieces of image information is 10, and the number of regions to arrange images on the template is 3. When deciding the parameters at random and generating a layout, if the layout generated subsequently includes two or more images used in the previously generated layout, the layout is excluded from temporary layout candidates.

As described above, in this embodiment, the generated layouts include the same images at less than a predetermined ratio. Hence, when control is performed such that images used in the previously generated layout are included in the layout to be generated next at less than a predetermined ratio when generating layouts, a verity of layouts can be provided to the user.

In addition, according to this embodiment, when sequentially generating layouts, preceding and subsequent layouts are prevented from becoming similar. For this reason, the display order can be decided not to continuously display similar layouts without changing the layout display order after layout generation.

Furthermore, in this embodiment, layouts are displayed after completion of layout generation. However, layout generation and display may sequentially be repeated for each layout. The layout generation ends when the user has designated a layout to be output. This facilitates the layout generation because layouts to be displayed after the layout designated by the user need not be generated.

The third embodiment has been described above.

<Other Embodiments>

In the above-described embodiments, the number of images of a plurality of pieces of image information is assumed to be much larger than the number of regions to arrange images on a template. If the number of images of the plurality of pieces of image information is not sufficiently large, similar images are selected regardless of layouts generated.

For example, when the number of regions to arrange images on a template is 3, and the number of images of a plurality of pieces of image information is 4, two images are always commonly included even when a plurality of layouts are generated. It may be impossible to implement the method depending on the number of images of a plurality of pieces of image information and the number of regions to arrange images on a template even when the same images are prohibited in advance from being included at a predetermined ratio or more.

Hence, to always display a plurality of layouts, it is necessary to dynamically change the predetermined ratio in accordance with the number of images of a plurality of pieces of image information and the number of regions to arrange images on a template.

For example, as the number of input images becomes close to the number of arrangement images to be laid out, the determination criterion of the layout similarity evaluation value is lowered to set a threshold that allows similarity. Alternatively, as the number of input images becomes far apart from the number of arrangement images to be laid out, the determination criterion of the layout similarity evaluation value is raised to set a threshold that does not allow great similarity.

Additionally, for example, the predetermined value used to perform control such that images used in a previously displayed layout are included in a layout to be displayed subsequently at less than a predetermined ratio may automatically be calculated from the number of images of a plurality of pieces of image information and the number of regions to arrange images on a template.

A value obtained by dividing the product of the necessary number of layouts and the number of regions to arrange images on a template by the number of images of a plurality of pieces of image information may be used. In this case, the formula is given by predetermined ratio=necessary number of layouts×
      number of regions to arrange images on template/number of images of plural pieces of image information×100%

For example, assume that the necessary number of layouts is 10, the number of regions to arrange images on a template is 3, and the number of images of a plurality of pieces of image information is 100. In this case, the predetermined ratio is obtained as 30 by predetermined ratio=10×3/100×100=30

Any method is usable if the predetermined ratio is automatically calculated in accordance with the plurality of pieces of image information.

Hence, when the predetermined ratio is changed in accordance with the number of images of a plurality of pieces of image information, a variety of layouts in which similar layouts hardly continue can be provided while considering the presence/absence of a layout that can be generated.

In the above-described embodiments, the predetermined ratio of images used in a previously displayed layout to images used in a layout to be displayed subsequently is preset or automatically set. However, the present invention is not limited to this. The predetermined ratio may be set by the user.

In this case, it is possible to meet a requirement to, for example, absolutely prevent arrangement of similar images by the user's intention.

In the above-described embodiments, the layout similarity evaluation value is calculated as the ratio of images used in a previously displayed layout to images used in a layout to be displayed subsequently, However, the present invention is not limited to this. For example, the ratio of the number of persons arranged in a layout to the number of identical registered persons may be calculated by comparing the preceding layout and the subsequent layout.

The nearness of shooting times as the metadata of images may be calculated as a numerical value. The ratio of the number of same images arranged at the same positions may be used. The nearness of trimming ratios for the same arrangement position may be calculated as a numerical value. Alternatively, for example, the similarly of average luminance values or shooting scene determination results obtained by image analysis may be obtained as a numerical value and used as the layout similarity evaluation value.

That is, any method capable of comparing the preceding layout and the subsequent layout and determining the layout similarity evaluation value based on one of image selection, image arrangement, and image manipulation or a combination thereof is usable.

In each of the layout similarity evaluation value calculation processing and the integrated layout evaluation value calculation processing, the value is obtained by one calculation formula. However, the present invention is not limited to this. A plurality of calculation formulas may be prepared. Upon receiving a layout switching instruction, a layout of a high evaluation value may be selected based on a value calculated by another calculation formula and displayed.

In the above-described embodiments, when comparing the preceding layout and the subsequent layout, whether they are similar is determined by calculating the layout similarity evaluation value, and the layout is selected. However, the present invention is not limited to this. For example, an item that particularly raises the layout evaluation value is extracted from feature amounts used by the layout evaluation value calculation unit of the preceding layout. When calculating the layout evaluation value of the subsequent layout, the layout evaluation value is calculated while lowering the weight of the item that raises the layout evaluation value of the preceding layout. In this case, since the weight of the layout evaluation value changes, it is possible to naturally prevent the preceding layout and the subsequent layout from becoming similar when sorted by the layout evaluation value.

As described above, any method is usable as long as a layout to be selected subsequently is controlled using already selected layout information.

In the above-described embodiments, a display switching portion for sequentially switching the layout display by pressing the Next button 2904 shown in FIG. 29 has been described. However, the present invention is not limited to this.

For example, a layout may be displayed on a touch panel, and the displayed layout may be switched when the user has performed a flick operation on the touch panel. In a system that automatically switches images like a slide show as well, any method is usable as long as a layout to be selected subsequently is controlled using already selected layout information.

Instead of switching the displayed layout, a plurality of layouts may be displayed such that they are arranged on the display screen. In this case, according to this embodiment, the layouts can be displayed while preventing the layouts continuously arranged from becoming similar.

In the above-described embodiments, the user can select one of the layouts displayed on the display device. The output method of the thus selected layout is not limited. For example, the layout selected by the user may be displayed on the display device, or a printing apparatus may print an image corresponding to the layout. The layouts can be stored in an internal or external memory of the information processing apparatus according to this embodiment. Alternatively, the layout data may be transmitted to an external apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154003, filed Jul. 9, 2012, which is hereby incorporated by reference herein in its entirety.

What is claimed is:

1. An apparatus comprising:
a memory configured to store at least one program; and
a processor configured to execute the at least one program,
wherein the processor determines a similarity between a first layout and a second layout, based on a number of one or more common images which are common between one or more first images laid out in a first template of the first layout and one or more second images laid out in a second template of the second layout,
wherein the processor causes a display device to display the first layout and the second layout as two layouts that are successive in a display order in a case where the determined similarity is not more than a predetermined similarity,
wherein the processor further determines a similarity between the first layout and a third layout, based on a number of one or more common images which are common between the one or more first images and one or more third images laid out in a third template of the third layout, and
wherein the processor causes the display device to display the first layout and the third layout as the two layouts that are successive in the display order, in a case where the determined similarity between the first layout and the second layout is more than is more than the predetermined similarity and the predetermined similarity between the first layout and the third layout is not more than the predetermined similarity.

2. The apparatus according to claim 1, wherein, in a case where the determined similarity between the first layout and the second layout is more than the predetermined similarity, the processor further determines the similarity between the first layout and the third layout.

3. The apparatus according to claim 1, wherein the processor determines that the similarity between the first layout and the second layout is not more than the predetermined similarity in a case where the one or more first images are included in the second layout as the one or more second images at less than a predetermined ratio.

4. The apparatus according to claim 1, wherein the processor generates the first layout and the second layout, by arranging the one or more first images on the first template and by arranging the one or more second images on the second template, and determines the similarity between the first layout and the second layout which have already been generated.

5. The apparatus according to claim 1, wherein the processor determines the similarity using the number of the one or more common images and a number of regions to arrange the one or more first images or the one or more second images on the first template or the second template.

6. The apparatus according to claim 1, wherein the processor causes a printing device to print a layout which is selected from the first layout and the second layout in accordance with an instruction by a user.

7. The apparatus according to claim 1, wherein the processor causes the display device to display the first layout and the second layout by sequentially switching a display target layout from the first layout to the second layout.

8. The apparatus according to claim 1, wherein the processor evaluates each of the first layout and the second layout as display target candidates, and determines whether the first layout and the second layout are displayed as the two layouts that are successive in display order, based on the similarity and the evaluation.

9. The apparatus according to claim 8, wherein the processor evaluates each of the first layout and the second layout based on a region corresponding to a face in each of the one or more first images and each of the one or more second images.

10. A method performed by a processor by executing at least one program stored in a memory, the method comprising:
determining, by the processor, a similarity between a first layout and a second layout, based on a number of one or more images which are common between one or more first images laid out in a first template of the first layout and one or more second images laid out in a second template of the second layout, and
causing, by the processor, a display device to display the first layout and the second layout as two layouts that are successive in a display order in a case where the determined similarity is not more than a predetermined similarity,
wherein the processor further determines a similarity between the first layout and a third layout, based on a number of one or more common images which are common between the one or more first images and one or more third images laid out in a third template of the third layout, and
wherein the display device is caused display the first layout and the third layout as the two layouts that are successive in the display order, in a case where the determined similarity between the first layout and the second layout is more than is more than the predetermined similarity and the predetermined similarity between the first layout and the third layout is not more than the predetermined similarity.

11. The method according to claim 10, wherein, in a case where the determined similarity between the first layout and the second layout is more than the predetermined similarity, the similarity between the first layout and the third layout is further determined.

12. The method according to claim 10, wherein it is determined that the similarity between the first layout and the second layout is not more than the predetermined similarity in a case where the one or more first images are included in the second layout as the one or more second images at less than a predetermined ratio.

13. The method according to claim 10, further comprising:
generating, by the processor, the first layout and the second layout, by arranging the one or more first images on the first template and by arranging the one or more second images on the second template,
wherein the similarity between the first layout and the second layout which have already been generated is determined.

14. The method according to claim 10, wherein the similarity is determined using the number of the one or more common images and a number of regions to arrange the one or more first images or the one or more second images on the first template or the second template.

15. The method according to claim 10, wherein a layout which is selected from the first layout and the second layout in accordance with an instruction by a user, is printed by a printing device.

16. The method according to claim 10, wherein the first layout and the second layout are displayed by sequentially switching a display target layout from the first layout to the second layout.

17. The method according to claim 10, further comprising evaluating each of the first layout and second layout as display target candidates, and determining whether the first layout and the second layout are displayed as the two layouts that are successive in display order, based on the similarity and the evaluation.

18. The method according to claim 17, wherein each of the first layout and the second layout is evaluated based on a region corresponding to a face in each of the one or more first images and each of the one or more second images.

19. A non-transitory computer-readable medium storing a program that causes a computer to execute a method using a processor that executes the stored program, the method comprising:
determining, by the processor, a similarity between a first layout and a second layout, based on a number of one or more image which are common between one or more first images laid out in a first template of the first layout and one or more second images laid out in a second template of the second layout; and
causing, by the processor, a display device to display the first layout and the second layout as two layouts that are successive in a display order in a case where the determined similarity is not more than a predetermined similarity,
wherein a similarity between the first layout and a third layout is further determined, based on a number of one or more common images which are common between the one or more first images and one or more third images laid out in a third template of the third layout, and
wherein the display device is caused display the first layout and the third layout as the two layouts that are successive in the display order, in a case where the determined similarity between the first layout and the second layout is more than is more than the predetermined similarity and the predetermined similarity between the first layout and the third layout is not more than the predetermined similarity.

* * * * *